(12) United States Patent
Stout et al.

(10) Patent No.: US 9,895,808 B2
(45) Date of Patent: Feb. 20, 2018

(54) METHODS AND SYSTEMS FOR COMPLETE COVERAGE OF A SURFACE BY AN AUTONOMOUS ROBOT

(71) Applicant: iRobot Corporation, Bedford, MA (US)

(72) Inventors: Michael S. Stout, Rancho Palos Verdes, CA (US); Gabriel Francis Brisson, Albany, CA (US); Enrico Di Bernardo, Glendora, CA (US); Paolo Pirjanian, Glendale, CA (US); Dhiraj Goel, Pasadena, CA (US); James Philip Case, Los Angeles, CA (US); Michael Dooley, Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/880,610

(22) Filed: Oct. 12, 2015

(65) Prior Publication Data
US 2016/0101523 A1 Apr. 14, 2016

Related U.S. Application Data

(63) Continuation of application No. 14/251,390, filed on Apr. 11, 2014, now Pat. No. 9,188,983, which is a
(Continued)

(51) Int. Cl.
*G05D 1/02* (2006.01)
*G05D 3/12* (2006.01)
(Continued)

(52) U.S. Cl.
CPC .............. *B25J 9/1684* (2013.01); *B25J 5/00* (2013.01); *B25J 5/005* (2013.01); *B25J 5/007* (2013.01);
(Continued)

(58) Field of Classification Search
CPC ... B25J 9/1684; B25J 5/00; B25J 5/005; B25J 5/007; B25J 9/163; G05D 1/0219; G05D 1/0274
See application file for complete search history.

(56) References Cited

U.S. PATENT DOCUMENTS

| | | | |
|---|---|---|---|
| 4,119,900 A | 10/1978 | Kremnitz | |
| 4,710,020 A | 12/1987 | Maddox et al. | |

(Continued)

FOREIGN PATENT DOCUMENTS

| | | | |
|---|---|---|---|
| CN | 2693167 | | 4/2005 |
| CN | 101480795 A | | 7/2009 |

(Continued)

OTHER PUBLICATIONS

Becker et al. "Reliable navigation using landmarks" *1995 Proceedings of the 1995 IEEE International Conference on Robotics and Automation* 1:401-46 (May 21-27, 1995).

(Continued)

*Primary Examiner* — Dale Moyer
(74) *Attorney, Agent, or Firm* — Myers Bigel, P.A.

(57) ABSTRACT

A robot configured to navigate a surface, the robot comprising a movement mechanism; a logical map representing data about the surface and associating locations with one or more properties observed during navigation; an initialization module configured to establish an initial pose comprising an initial location and an initial orientation; a region covering module configured to cause the robot to move so as to cover a region; an edge-following module configured to cause the robot to follow unfollowed edges; a control module configured to invoke region covering on a first region defined at least in part based at least part of the initial pose, to invoke region covering on least one additional region, to invoke edge-following, and to invoke region covering cause the mapping module to mark followed edges as followed, and (Continued)

cause a third region covering on regions discovered during edge-following.

21 Claims, 21 Drawing Sheets

Related U.S. Application Data continuation of application No. 12/940,871, filed on Nov. 5, 2010, now Pat. No. 9,026,302.

(60) Provisional application No. 61/280,678, filed on Nov. 6, 2009.

(51) Int. Cl.
  *B25J 9/16* (2006.01)
  *B25J 5/00* (2006.01)
  *G05D 1/00* (2006.01)
  *B08B 7/00* (2006.01)

(52) U.S. Cl.
  CPC ............ *B25J 9/163* (2013.01); *G05D 1/0219* (2013.01); *G05D 1/0234* (2013.01); *G05D 1/0238* (2013.01); *G05D 1/0255* (2013.01); *G05D 1/0257* (2013.01); *G05D 1/0263* (2013.01); *G05D 1/0272* (2013.01); *G05D 1/0274* (2013.01); *G05D 2201/0203* (2013.01); *G05D 2201/0208* (2013.01); *G05D 2201/0215* (2013.01); *Y10S 901/01* (2013.01); *Y10S 901/46* (2013.01)

(56) References Cited

U.S. PATENT DOCUMENTS

| | | |
|---|---|---|
| 4,846,297 A | 7/1989 | Field et al. |
| 5,002,501 A | 3/1991 | Tucker |
| 5,155,684 A | 10/1992 | Burke et al. |
| 5,258,822 A | 11/1993 | Nakamura et al. |
| 5,696,675 A | 12/1997 | Nakamura et al. |
| 5,844,232 A | 12/1998 | Pezant |
| 5,940,170 A | 8/1999 | Berg et al. |
| 6,240,342 B1 | 5/2001 | Fiegert et al. |
| 6,263,989 B1 | 7/2001 | Won |
| 6,278,917 B1 | 8/2001 | Bauer et al. |
| 6,299,699 B1 | 10/2001 | Porat et al. |
| 6,389,329 B1 | 5/2002 | Colens |
| 6,431,296 B1 | 8/2002 | Won |
| 6,459,955 B1 | 10/2002 | Bartsch et al. |
| 6,463,368 B1 | 10/2002 | Feiten |
| 6,504,610 B1 | 1/2003 | Bauer et al. |
| 6,535,793 B2 | 3/2003 | Allard |
| 6,574,536 B1 | 6/2003 | Kawagoe et al. |
| 6,604,005 B1 | 8/2003 | Dorst et al. |
| 6,629,028 B2 | 9/2003 | Paromtchik et al. |
| 6,654,482 B1 | 11/2003 | Parent et al. |
| 6,667,592 B2 | 12/2003 | Jacobs et al. |
| 6,688,951 B2 | 2/2004 | Kashiwaya et al. |
| 6,742,613 B2 | 6/2004 | Elrich et al. |
| 6,845,297 B2 | 1/2005 | Allard |
| 6,906,702 B1 | 6/2005 | Tanaka et al. |
| 7,069,124 B1 | 6/2006 | Whittaker et al. |
| 7,075,661 B2 | 7/2006 | Petty et al. |
| 7,079,943 B2 | 7/2006 | Flann et al. |
| 7,117,067 B2 | 10/2006 | McLurkin et al. |
| 7,225,552 B2 | 6/2007 | Kwon et al. |
| 7,254,464 B1 | 8/2007 | McLurkin et al. |
| 7,332,890 B2 | 2/2008 | Cohen et al. |
| 7,388,343 B2 | 6/2008 | Jones et al. |
| 7,539,557 B2 | 5/2009 | Yamauchi |
| 7,546,891 B2 | 6/2009 | Won |
| 7,556,108 B2 | 7/2009 | Won |
| 7,597,162 B2 | 10/2009 | Won |
| 7,706,917 B1 | 4/2010 | Chiappetta et al. |
| 7,720,554 B2 | 5/2010 | DiBernardo et al. |
| 7,720,572 B2 | 5/2010 | Ziegler et al. |
| 7,761,954 B2 | 7/2010 | Ziegler et al. |
| 7,827,643 B2 | 11/2010 | Elrich et al. |
| 7,996,097 B2 | 8/2011 | DiBernardo et al. |
| 8,295,955 B2 | 10/2012 | DiBernardo et al. |
| 8,380,350 B2 | 2/2013 | Ozick et al. |
| 8,396,592 B2 | 3/2013 | Jones et al. |
| 8,412,377 B2 | 4/2013 | Casey et al. |
| 8,428,778 B2 | 4/2013 | Landry et al. |
| 8,452,450 B2 | 5/2013 | Dooley et al. |
| 9,026,302 B2 | 5/2015 | Stout et al. |
| 9,188,983 B2 | 11/2015 | Stout et al. |
| 2001/0013929 A1 | 8/2001 | Torsten |
| 2001/0037163 A1 | 11/2001 | Allard |
| 2002/0016649 A1 | 2/2002 | Jones |
| 2002/0104963 A1 | 8/2002 | Mancevski |
| 2002/0159051 A1 | 10/2002 | Guo |
| 2002/0189871 A1 | 12/2002 | Won |
| 2003/0048081 A1* | 3/2003 | Seemann ............... B62D 55/00 318/68 |
| 2003/0058262 A1 | 3/2003 | Sato et al. |
| 2003/0193657 A1 | 10/2003 | Uomori et al. |
| 2003/0208304 A1 | 11/2003 | Peless et al. |
| 2003/0233870 A1 | 12/2003 | Mancevski |
| 2004/0125461 A1 | 7/2004 | Kawamura |
| 2005/0000543 A1* | 1/2005 | Taylor .................. G05D 1/0219 134/18 |
| 2005/0010330 A1 | 1/2005 | Abramson et al. |
| 2005/0033124 A1 | 2/2005 | Kelly et al. |
| 2005/0156562 A1 | 7/2005 | Cohen et al. |
| 2005/0171644 A1* | 8/2005 | Tani ..................... A47L 9/009 700/253 |
| 2005/0213109 A1 | 9/2005 | Schell et al. |
| 2006/0020369 A1 | 1/2006 | Taylor et al. |
| 2006/0150361 A1 | 7/2006 | Aldred et al. |
| 2007/0045018 A1 | 3/2007 | Carter |
| 2007/0061043 A1 | 3/2007 | Ermakov et al. |
| 2007/0114975 A1 | 5/2007 | Cohen et al. |
| 2007/0156286 A1 | 7/2007 | Yamauchi |
| 2007/0234492 A1 | 10/2007 | Svendsen et al. |
| 2007/0267230 A1 | 11/2007 | Won |
| 2007/0267998 A1 | 11/2007 | Cohen et al. |
| 2008/0007203 A1 | 1/2008 | Cohen et al. |
| 2008/0039974 A1 | 2/2008 | Sandin et al. |
| 2008/0046125 A1 | 2/2008 | Myeong et al. |
| 2008/0047092 A1 | 2/2008 | Schnittman et al. |
| 2008/0058987 A1 | 3/2008 | Ozick et al. |
| 2008/0063400 A1 | 3/2008 | Hudson et al. |
| 2008/0086241 A1 | 4/2008 | Phillips et al. |
| 2008/0091304 A1 | 4/2008 | Ozick et al. |
| 2008/0109126 A1 | 5/2008 | Sandin et al. |
| 2008/0121097 A1 | 5/2008 | Rudakevych et al. |
| 2008/0133052 A1 | 6/2008 | Jones et al. |
| 2008/0134458 A1 | 6/2008 | Ziegler et al. |
| 2008/0140255 A1 | 6/2008 | Ziegler et al. |
| 2008/0143063 A1 | 6/2008 | Won |
| 2008/0143064 A1 | 6/2008 | Won |
| 2008/0155768 A1 | 7/2008 | Ziegler et al. |
| 2008/0236907 A1 | 10/2008 | Won |
| 2008/0266254 A1 | 10/2008 | Robbins et al. |
| 2008/0276407 A1 | 11/2008 | Schnittman et al. |
| 2008/0276408 A1 | 11/2008 | Gilbert, Jr. et al. |
| 2008/0281470 A1 | 11/2008 | Gilbert, Jr. et al. |
| 2008/0294288 A1 | 11/2008 | Yamauchi |
| 2009/0065271 A1 | 3/2009 | Won |
| 2009/0107738 A1 | 4/2009 | Won |
| 2009/0173553 A1 | 7/2009 | Won |
| 2009/0182464 A1* | 7/2009 | Myeong ............... G05D 1/0246 701/25 |
| 2009/0232506 A1 | 9/2009 | Hudson et al. |
| 2009/0281661 A1 | 11/2009 | Dooley et al. |
| 2010/0076600 A1 | 3/2010 | Cross et al. |
| 2010/0139995 A1 | 6/2010 | Rudakevych |
| 2010/0198443 A1 | 8/2010 | Yabushita et al. |
| 2010/0235033 A1 | 9/2010 | Yamamoto et al. |
| 2010/0241289 A1 | 9/2010 | Sandberg |

(56) References Cited

U.S. PATENT DOCUMENTS

2011/0125323 A1 5/2011 Gutmann et al.
2013/0245937 A1 9/2013 DiBernardo et al.

FOREIGN PATENT DOCUMENTS

| CN | 101084817 B | 8/2012 |
|---|---|---|
| DE | 4338841 | 5/1995 |
| EP | 0294101 | 12/1988 |
| EP | 0479273 | 4/1992 |
| EP | 0798567 | 10/1997 |
| FR | 2601443 | 1/1998 |
| GB | 2284957 | 6/1995 |
| JP | 59112311 | 6/1984 |
| JP | 59184917 | 10/1984 |
| JP | 60089213 | 5/1985 |
| JP | 05257527 | 10/1993 |
| JP | 05285861 | 11/1993 |
| JP | 8-16241 | 1/1996 |
| JP | H 08-16241 | 1/1996 |
| JP | H 10-27018 | 1/1998 |
| JP | 2001-522079 | 11/2001 |
| JP | 2002-082720 | 3/2002 |
| JP | 2003-515210 | 4/2003 |
| JP | 2004-033340 | 2/2004 |
| JP | 2007-209392 | 8/2007 |
| WO | WO 99/23543 | 5/1999 |
| WO | WO 01/37060 | 5/2001 |
| WO | WO 2009/132317 | 10/2009 |

OTHER PUBLICATIONS

Chinese Office Action Corresponding to Chinese Application No. 201080058160.1 dated Mar. 19, 2014.
Extended European Search Report Corresponding to European Application No. 10829201.2 dated Jul. 23, 2014.
International Search Report Corresponding to PCT Application No. PCT/US05/010200 dated Aug. 2, 2005.
International Search Report Corresponding to PCT Application No. PCT/US05/010244 dated Aug. 2, 2005.
International Search Report Corresponding to PCT Application No. PCT/US2010/055740, dated Jan. 5, 2011.
Japanese Office Action Corresponding to Japanese Application No. 2007-506413 dated May 26, 2010.
Schultz et al. "Continuous localization using evidence grids" *Proceedings of the 1998 IEEE International Conference on Robotics and Automation* 4:2833-2839 (1998).
Yamauchi "A Frontier-Based Approach for Autonomous Exploration" *Proceedings of the 1997 IEEE International Symposium on Computational Intelligence in Robotics and Automation* 146-151 (1997).
Notification of Accepting Invalidation Request Corresponding to Chinese Patent Application No. 201080058160.1 (Foreign Text, 40 Pages, Partial English Translation Thereof, 24 Pages) (dated Oct. 30, 2017).

\* cited by examiner

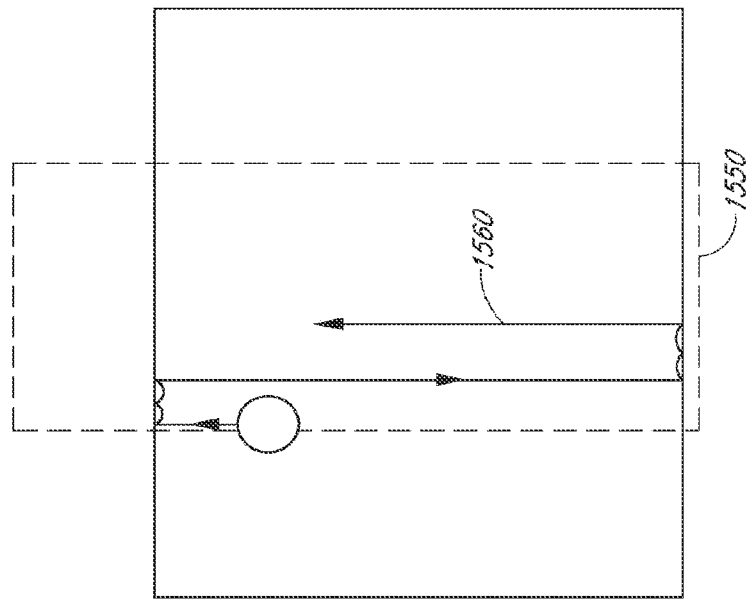
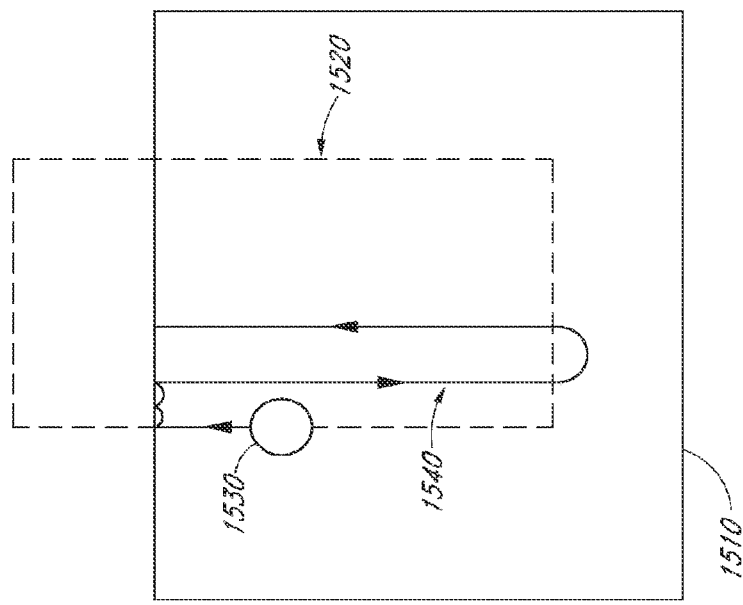
FIG. 15A
FIG. 15B

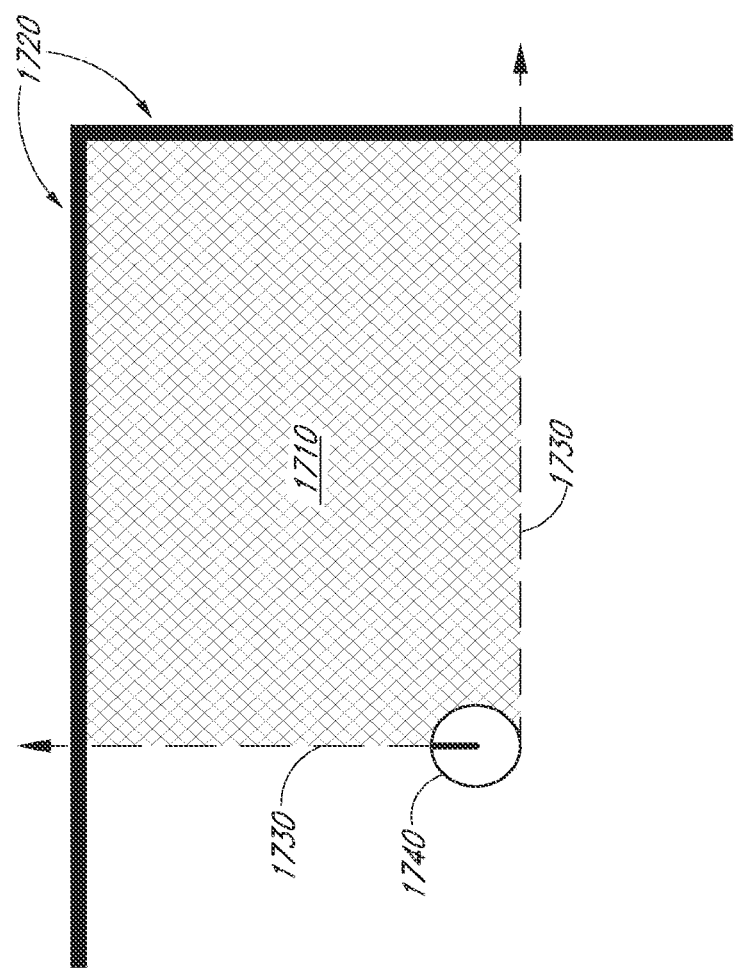

METHODS AND SYSTEMS FOR COMPLETE COVERAGE OF A SURFACE BY AN AUTONOMOUS ROBOT

CROSS-REFERENCE TO RELATED APPLICATIONS

This application is a continuation of U.S. application Ser. No. 14/251,390 filed Apr. 11, 2014, which was a continuation of U.S. application Ser. No. 12/940,871 filed Nov. 5, 2010 (now U.S. Pat. No. 9,026,302 issued May 5, 2015) which application claimed the benefit under 35 U.S.C. § 119(e) of U.S. Provisional Application No. 61/280,678, filed Nov. 6, 2009, the entirety of which are hereby incorporated by reference.

BACKGROUND

Field of Endeavor

What is disclosed herein relates to navigating in an unknown environment.

Description of the Related Art

It is often necessary or useful to navigate in an unknown environment or surface so that all or substantially all of that unknown surface is traversed (covered) by a mobile device (e.g., when painting or cleaning). Certain systems and methods for establishing coverage paths over a surface in an unknown environment are known. However, such systems often behave in ways that appear random to users (which may, for example, make users doubt the efficacy of the cleaning performed by the mobile device), often fail to cover readily accessible portions of the surface promptly or efficiently, and often fail to cover accessible portions of the surface that are proximate to a first location on that surface before attempting to cover more remote portions. Some conventional systems also fail to thoroughly cover perimeters of the surface (including the perimeters of obstacles which are internal or partially internal to the surface).

SUMMARY

Certain embodiments discussed in this application may be used in conjunction with systems and methods disclosed in U.S. Pat. No. 7,720,554, filed on Mar. 25, 2005 as U.S. Patent Application 2005/0213082, the content of which is hereby incorporated herein in its entirety by reference. Also, certain embodiments discussed in this application may be used in conjunction with systems and methods disclosed in U.S. patent application Ser. No. 12/429,963, filed on Apr. 24, 2009, the content of which is hereby incorporated herein in its entirety by reference.

Disclosed is a mobile device configured to navigate a surface, the mobile device comprising a movement mechanism configured to move the mobile device from a first pose comprising a first location and a first orientation to a second pose comprising a second location and a second orientation; a mapping module configured to update a map representing data about the surface, the map associating locations with one or more properties, the properties comprising properties sufficient to indicate "unexplored", "traversed", "edge", and/or "occupied"; an initialization module configured to establish an initial pose comprising an initial location and an initial orientation; a first region-covering module configured to cause the movement mechanism to move the mobile device so as to cover a first region defined at least in part based on at least one component of the initial pose and further configured to cause the mapping module to update the map; a second region-covering module configured to cause the movement mechanism to move the mobile device so as to cover respective of at least one additional regions and to cause the mapping module to update the map, wherein the first region and the at least one additional regions are non-overlapping; and an edge-following module configured to identify one or more unfollowed edges, cause the movement mechanism to move the mobile device so as to follow respective unfollowed edges, cause the mapping module to mark followed edges as followed, and cause a third region-covering module to cause the movement mechanism to move the mobile device so as to cover one or more edge-discovered regions if such regions are discovered.

Also disclosed is a method for navigating a surface with a mobile device, the method comprising: defining a reference frame using a computing device, based on at least a component of a first pose of a mobile device on a surface having one or more borders and containing one or more obstacles, the first pose comprising a first position and a first orientation; exploring, by the mobile device, a first region of the surface, the first region determined based at least in part on a component of the first pose; exploring, by the mobile device, at least one first additional region of the surface after exploring the first region; maintaining a map of information about the surface in computer readable memory, wherein at least a portion of the information is obtained by exploring the first region and the additional region; perimeter-following one or more unfollowed perimeter portions when analysis of the map indicates one or more unfollowed perimeter portions exists; and exploring unexplored second additional surface regions discovered while perimeter-following.

Perimeter-following comprises: navigating the mobile device to a first position on a first perimeter portion that is unfollowed; following the first perimeter portion, relying at least in part on one or more sensors to determine how to follow the first perimeter portion; updating the map to indicate that the followed first perimeter portion is followed; and updating the map with additional information about one or more locations traversed while following the first perimeter portion. Exploring a region comprises: navigating the mobile device in the region; updating the map to indicate one or more discovered perimeters, perimeters comprising surface borders and obstacle boundaries, when such are identified; and updating the map to indicate that traversed portions of the surface have been explored.

BRIEF DESCRIPTION OF THE DRAWINGS

The disclosed aspects will hereinafter be described in conjunction with the appended drawings, which are provided to illustrate and not to limit the disclosed aspects. Like designations denote like elements.

FIGS. 15A-15B illustrates an example of dynamic resizing of a region.

FIG. 17 illustrates an example of restricted coverage.

DETAILED DESCRIPTION OF PREFERRED EMBODIMENTS

Figure 1:
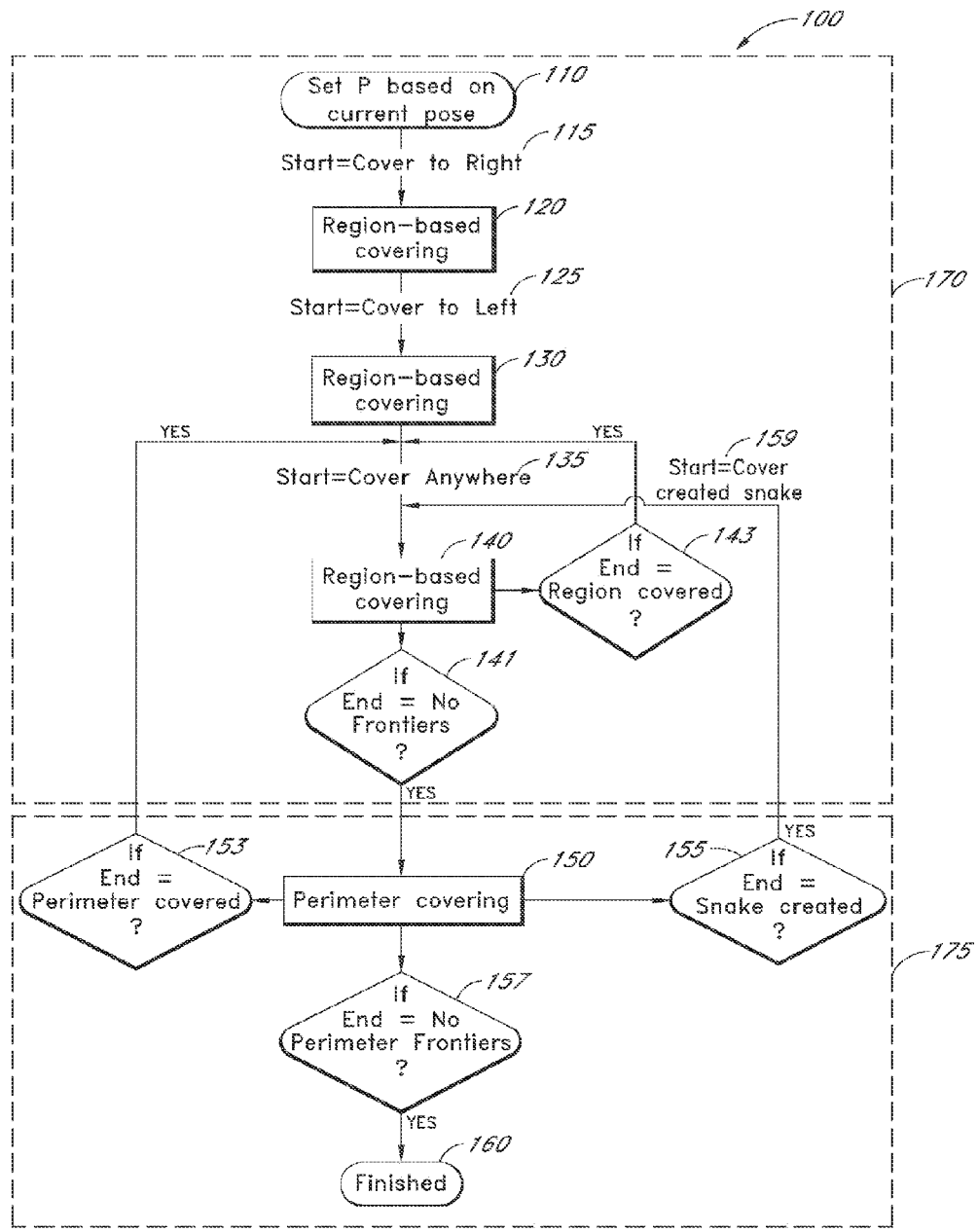
FIG. 1 is a flow chart illustrating an example of a process one embodiment may use to navigate an unknown area such as a surface.

Described herein are methods and systems for navigating an object, such as a mobile device (e.g., a robotic floor cleaner) in an environment, such as an unknown environment. Certain embodiments may use such navigation to completely cover or substantially cover an exposed environment or a portion of an environment (e.g., a carpeted or uncarpeted floor).

Certain methods and systems disclosed herein advance the state of the art in how a mobile device with access to information about its relative location and orientation (pose) in an environment is able to navigate in that environment, optionally without a priori knowledge of the layout of that environment. A mobile device configured in accordance with certain methods and systems disclosed herein navigates so as to cover or substantially cover an environment (e.g., traverse all or nearly all traversable locations in the environment, such as a floor, excluding portions that are not traversable because of an obstacle, such as an item of furniture, a pet, a person, a stair, etc.).

Another example mobile device configured in accordance with methods and systems disclosed herein achieves such coverage of an environment predictably (e.g., it tends to follow a similar or substantially similar route in the environment on separate coverage efforts, or tend to complete coverage or substantial coverage of the environment in the same or substantially the same amount of time on separate coverage efforts, in an organized fashion). This has the added optional benefit of letting users watching the operation of the mobile device be confident that the mobile device is thoroughly performing its task in an organized fashion. Further, because certain embodiments operate in a predicable fashion, if a user needs to walk across the surface being operated on by the mobile device, the user can predict what area the mobile device will not be traversing in the immediate future (e.g., in the next minute), and select that area to walk across.

Yet another example embodiment of a mobile device configured in accordance with methods and systems disclosed herein achieves complete coverage or substantially complete coverage of a surface or other environment in a reduced amount of time as compared to conventional devices (assuming the conventional devices can move at the same speed as the yet another embodiment).

Some disclosed embodiments can optionally achieve these results while using relatively inexpensive amounts of computational resources such as processing power, storage, and time, such that the functionality disclosed herein can be made available in a relatively compact mobile device and/or it can be distributed in affordable mass market consumer goods, including products which perform additional functionality beyond navigating.

Definitions

Through the description herein, "localization" may include determining both the location of an object in an environment and the orientation of that object. A combination of location and orientation is referred to as a "pose".

"Navigate" is a broad term and is to be given its ordinary and customary meaning to a person of ordinary skill in the art (i.e., it is not to be limited to a special or customized meaning) and includes, without limitation, determining a route, such as a route from a source location to a destination location, and moving in an environment ("traversing") in accordance with that route. Traversing may be performed, without limitation, by moving on wheels or tracks or the like, by flying or gliding, by swimming or floating, by moving logically through a virtual space, by burrowing through material, and the like. Locations in an environment or portions of an environment may be "covered" or "traversed" or "explored" or "navigated" when a mobile devices moves in them.

"Cover" is a broad term and is to be given its ordinary and customary meaning to a person of ordinary skill in the art (i.e., it is not to be limited to a special or customized meaning) and includes, without limitation, traversing all or substantially all locations of an environment that are traversable and accessible from a starting location; traversing sufficient such locations such that all or substantially all such locations can be operated upon by a mobile device configured to perform an operation; and the like. The term "cover" may also be applied to a portion of an environment. Illustrative examples of when an environment or portion thereof may be considered "covered" include if at least 100%, 95%, 90%, 85%, or some other threshold percentage or proportion of the traversable locations are processed (e.g., traversed or operated upon), or if a threshold amount is covered or not covered. For example, a vacuum cleaner may be considered to have covered a room with 100 square feet of accessible surface (e.g., surface that is not inaccessible because of an obstacle, such as an item of furniture, a pet, a person, a stair, etc.) if it has traversed at least a threshold of those square feet, such as 80, 85, 90, 95, or 99. Or, an example sweeper may be considered to have covered a floor if less than a threshold number of square feet of accessible floor were not swept (such as 1, 5, 10, or 100), regardless of the total amount of accessible floor. In some applications, such as sweeping or vacuuming, it may be particularly important that a mobile device make explicit coverage of a portion of the environment comprising its "perimeter". For example, sweeping and vacuuming often cause debris to gather near walls, furniture, or other obstacles. For other applications, for example dispersing seed or detergent, it may not be necessary to explicitly cover an environment's perimeter so long as the environment is generally covered.

For convenience, much of this disclosure is expressed in terms of a "mobile device" or a "mobile object". However, the disclosed aspects may generally be used to navigate any type of objects, and one of skill in the art will understand how the disclosure can be applied to other objects, including those that are not independently mobile (such as those that are transported or carried by something else). By way of illustration and not limitation, a mobile device may be an autonomous, semiautonomous, or remotely directed floor cleaner (e.g., a sweeper, a vacuum, a lawn mower, and/or a mapper), delivery vehicle (e.g., that delivers mail in a building, food in a hospital or dormitory, etc.), or monitoring vehicle (e.g., pollution or contaminant detector, security monitor). A mobile device may be equipped with one or more drive motors which drive one or more wheels, tracks, or other such devices, where the drive motors may be under control of a computing device executing a program stored in non-transitory memory (e.g., it persists when the object is powered down or when some other data is overwritten or erased). A mobile device may be configured to navigate for the sake of navigation, or it may be configured to perform additional tasks, including without limitation those referenced above, as well as recoding (video, audio, and or other data), mopping, trimming, cutting, and dispensing (e.g., paint, sealant, seeds, fertilizer, or pool cleaner). A mobile device may be a robot configured to perform any of these functions and/or other functions. In sum, "mobile object" and "mobile device" are broad terms and are to be given their ordinary and customary meaning to a person of ordinary skill in the art (i.e., they are not to be limited to a special or customized meaning) and include, without limitation, the examples mentioned above.

"Environment" is a broad term and is to be given its ordinary and customary meaning to a person of ordinary skill in the art (i.e., it is not to be limited to a special or customized meaning) and includes, without limitation, individual rooms, multiple rooms, corridors, vehicle interiors, lawns, fields, patios, roofs, sidewalks, roads, bodies of water or fluid, swimming pools, floors, ceilings, walls, unenclosed and partially enclosed outdoor spaces, portions of the preceding, and the like.

"Surface" is a broad term and is to be given its ordinary and customary meaning to a person of ordinary skill in the art (i.e., it is not to be limited to a special or customized meaning) and includes, without limitation, that part of an environment which a mobile device navigates or attempts to navigate, such as a floor, wall, ceiling, ground, fence, interior, top, bottom, side, exterior, and the like. A surface need not be planar or substantially planar but may include, for example, the interior volume of an environment (such that navigating such a surface involves moving in that surface in three dimensions).

Typically, a surface has one or more borders. "Border" is a broad term and is to be given its ordinary and customary meaning to a person of ordinary skill in the art (i.e., it is not to be limited to a special or customized meaning) and includes, without limitation, the defining boundaries of a floor such as are established by walls or molding, the defining boundaries of a surface as set by predetermined dimensions (e.g., a surface may be defined as being 5 meters by 6 meters by 4 meters, or being circular with center at a particular location and a defined radius), the defining boundaries of a surface as established based on properties of a mobile device (e.g., because its power or localization signals degrade below a threshold when it navigates beyond certain locations), and the like. It should be understood, unless the context indicates otherwise, that a border may be a "virtual" border (e.g., defined by the mobile device), rather than a physical barrier.

"Occupancy map" or "map" is a logical structure associating a location in an environment or a surface with information and attributes about that location. "Occupancy map" is a broad term and is to be given its ordinary and customary meaning to a person of ordinary skill in the art (i.e., it is not to be limited to a special or customized meaning) and may be implemented in a wide range of fashions, including without limitation, as a map of locations to properties; as a map of properties to locations; using database techniques, using a variety of associative data structures, or any other embodiment that one of skill in the art may chose as appropriate for the circumstances and requirements. Thus, it is understood that a map need not be a visible map, but may be defined via data stored in computer readable memory. As is elaborated on, a map may correspond to an actual surface with different degrees of precisions and/or accuracy. Precision may be affected, for example, by the use of discrete map cells that correspond to a portion of the surface. The size of those cells, which may each correspond to a 10 cm×10 cm portion of the surface, or a 1 m×1 m portion of the surface (for example—they need not be square or even all of the same size) may affect precision by imposing limitations on the granularity of observed properties. Accuracy may be affected by sensor quality and the like, including various other factors mentions herein. Embodiments may perform some or all analyses discussed herein based on information in a map.

"Explored" locations are those locations or portion of a surface that a mobile device was able to traverse. It may exclude, for example, portions of a floor under furniture that a mobile device is unable to slip under or portions of a lawn that a mobile device is unable to reach because it is unable to travel through mud or water. In other circumstances, (e.g., if the mobile device is suitably small, configured for 'off-roading', or able to navigate water), then these areas may potentially become explored areas. Explored area may also exclude portions of the surface that the mobile device has not yet traversed but which are traversable.

"Occupied" locations may include those portions of a surface that a mobile device is unable to traverse. Portions may be occupied if there are physical obstacles that prevent the mobile device from traversing that portion, if a property of the surface renders a portion of it inaccessible, if a power supply or control signal or other necessary element of the mobile device's operation does not function adequately in that portion, and the like.

A "snake" is a type of path or route by which some mobile devices may traverse a portion of a surface. By way of illustration, and not limitation, a mobile device may be said to have "taken a snake in a portion of a surface" or it may be said that "a snake is available for a mobile device to follow". A mobile device following such a path is "snaking". This term is elaborated on more completely below.

"Frontier" refers to a boundary between an explored and unexplored portion of a surface. In some embodiments, a "snake frontier" refers to a frontier selected or eligible for snaking into. In some embodiments, a mobile device will navigate into the unexplored side of a frontier by snaking. In some maps, a frontier may be comprised of traversed or explored locations which have unexplored locations neighboring them. In other maps, a frontier may be comprised of unexplored locations immediately adjacent to explored or traversed locations.

A "perimeter" of a surface may include borders of the surface as well as the edges of any obstacles in or partially in the surface. For example, the footprint of a piece of furniture or the outline of a sleeping pet may be part of a perimeter. So too might the three dimensional contours of a dense rock in an underground environment where the traversable surface comprises less dense dirt and a mobile device is unable to traverse through the rock.

An "edge" is a boundary between an explored and occupied portion of a surface. For example, an edge might surround the trunk of a tree in a lawn-mower embodiment. Some frontier locations may also be edge locations if an occupied location is considered unexplored or if those locations are part of both a boundary with occupied locations and another boundary with unexplored locations. Embodiments may define frontiers, edges, and/or perimeters with respect to a map, based at least in part on at least some of the properties of at least some of the locations in the map.
Methods and Systems for Navigating for Coverage Example embodiments will now be described with reference to certain figures. The following detailed descriptions are generally made with reference to a two-dimensional surface such as a floor or wall. This disclosure can readily be extended by one of skill in the art to apply to movement and surfaces having three dimensions.

Overview of a Coverage Process

FIG. 1 is a flow-chart illustrating an example control process 100 for covering a surface. The example process includes the following covering phases: (i) region-based covering; and (ii) perimeter covering or following. Region-based covering is generally directed to coverage of accessible portions of a surface, while perimeter covering is generally directed to coverage of a perimeter of a surface (borders and edges).

As shown in FIG. 1, at state 110 the current pose P of the mobile device is obtained, for example using a signal based localization system or a dead reckoning system. In the illustrated embodiment, the coverage process 100 establishes a starting location and principal axes of navigation (coverage direction) defined at least in part by P. In one embodiment, a user can establish P by placing a mobile device onto a surface. In another embodiment, the mobile device might assume a particular starting location and/or orientation on its own. Such an embodiment may use, for example, the systems and methods of U.S. Pat. No. 7,720,554 to identify and assume a pose. In yet another embodiment, the mobile device may presume or require that it has been placed in a particular initial pose, with subsequent processing relying on that presumption. In still another embodiment, the mobile device may travel until it encounters an obstacle, optionally identify that obstacle as a wall or other border, and establish P based on the apparent position and/or orientation of the obstacle.

In one embodiment of process 100, the starting location is defined, logically, as (0, 0) and the starting orientation is defined, logically, to be $\pi/2$ radians (90 degrees). That is, the reference frame or coordinate system used by the embodiment is relative to the initial pose P. Any other initial location or orientation definition could be used, and the description below would be adjusted accordingly.

Figure 2:
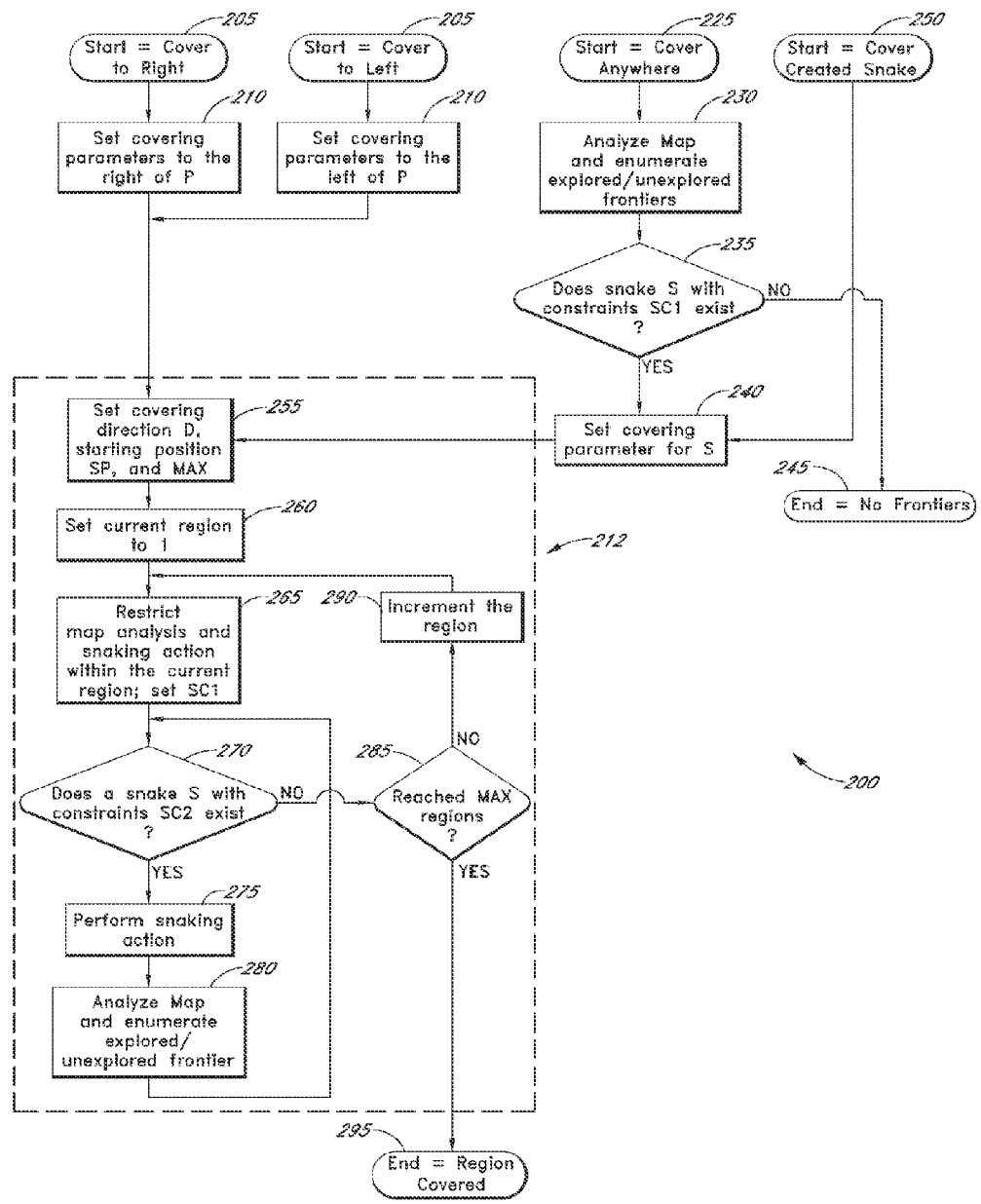
FIG. 2 is a flow chart illustrating an example of a process an embodiment may use to cover a region, such as when performing the process illustrated in FIG. 1.

In accordance with process 100, a mobile device first performs region-based covering to the right of this starting location at state 120 by invoking a region based coverage process such as process 200 of FIG. 2 with a strut condition set to "cover to right" in state 115. Once the mobile device finishes region covering to the right, it performs a similar covering action to the left of the initial starting location P by setting the start parameter to "cover to left" at 125 and invoking process 200 at 130.

After covering to both the left and the right, there may still be non-perimeter portions of the surface that the mobile device has not covered. For example, one or both of the cover-left and cover-right routines may directly or indirectly impose a maximum on the distance the mobile device can travel or on the amount of surface it may cover. Also, one or both of the routines may be interrupted, such as by the need for the mobile device to charge or to have consumables replaced, by a user pausing operations, or by an exception such as may be associated with the mobile device entering an error state including but not limited to losing traction, being stuck in a recess or on a peak stuck, or becoming wedged. Illustrated process 100 delegates checking for potential portions of the surface that have yet to be covered to process 200, which it invokes at 140 with the start parameter set to "cover anywhere" at state 135. In other embodiments, this check could be performed by other processes or at other times. For example, it could be a concluding state of process 200 when it is invoked with "cover to left" or it could be performed or invoked by process 100 directly.

An example process illustrating how such pm1ions of the surface may be identified and covered is discussed below, in the context of FIG. 2. If such a portion is found, the region-based covering process 200 returns with a value of "region covered" at 143 and process 200 is again invoked with start set to "cover anywhere". If no such portion is found, the process 200 returns with a value of "no frontiers" at 141. If this happens, the mobile device should have substantially covered the identified accessible or traversable portions of the surface and created a fairly complete map of those portions. Process 100 then continues to state 150, where it invokes a perimeter covering process 300.

Figure 3:
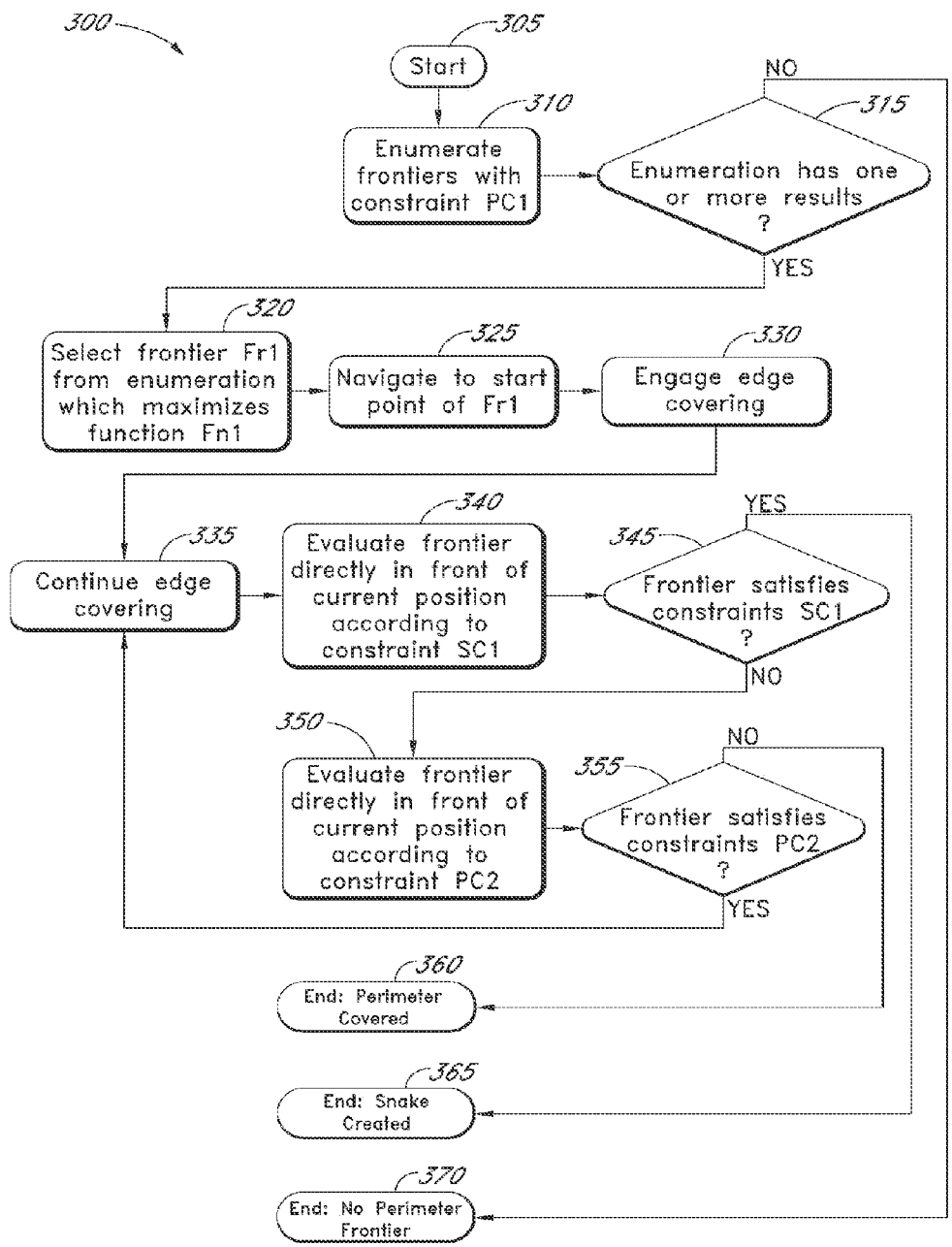
FIG. 3 is a flow chart illustrating an example of a process an embodiment may use to follow a perimeter, such as when performing the process illustrated in FIG. 1.

An example of a perimeter covering process 300 is shown in FIG. 3 and is discussed in more detail below. At a high level, such a process 300 analyses the map or otherwise selects an un-followed edge or border (perimeter) to cover or navigate along, navigates along that perimeter, updates the map as it does so, and determines if continued perimeter covering is necessary.

Process 100, as illustrated, handles at least three return values or states of process 300. If process 300 terminates with status "snake created" as at 155, then a new unexplored portion of the surface was discovered and a snake into that portion was identified. In that case, process 200 is invoked at state 140 after the start parameter is set to "cover created snake" at state 143. If process 300 terminates with condition "perimeter covered" then process 100 may cease. Alternatively (and as illustrated), in response to "perimeter covered" process 100 may loop back to invoke region-based covering process 200 with "cover anywhere" via states 135 and 140. This is an extra precaution in some embodiments to account for situations where noise in the map (such as from sensor inaccuracies or anomalies, defects or deviations in a mobile device's mechanical aspects, or other errors in localization) causes the mobile device to fail to correctly map or correctly characterize locations and thus fail to identify and explore one or more frontiers. If this precautionary run of process 200 identifies no frontiers, process 100 again invokes perimeter covering process 300, which may cause the mobile device to follow another perimeter that has not been perimeter-covered. Yet another alternative is for process 100 to loop back directly into perimeter covering process 300 for an additional pass when a first invocation of that process concludes with condition "perimeter covered", without an intervening invocation of region-based covering process 200.

If process 300 concludes that there are no perimeter frontiers in the map, it may return with condition "no perimeter frontiers", as at 157. The mobile device may then cease its coverage control routine, as at 160.

At this point 160, a mobile device may signal (e.g., through an audible, visual, tactile, or electronic communication to a user, through a wired or wireless signal or other interface to an invoking device, and/or to a monitoring application) that it has completed covering and/or an action, such as cleaning, associated with covering. Some mobile device may navigate to a charging station, storage bin, their initial location or pose, or a predefined next location or pose.

Some such embodiments may choose one or more behaviors to take upon conclusion based on one or more conditions. For example, an embodiment may return to a start pose or location unless a next location or pose has been set. Another embodiment may send an email indicating that coverage is complete, return to a charging station if it is in need of charging, and otherwise proceed to cover the surface again (e.g., return to state 110, perhaps with a different starting pose than the previous time it performed state 110).

To provide predictable and consistent behavior across different runs, a mobile device optionally advantageously invokes region-based covering process 200 at states 120 and 130 with the same parameters in the same order each time (although in other embodiments, different parameters and/or orders may be used from iteration to iteration, as discussed below). Thus, when such a process 100 is run, the initial behavior of the mobile device will be consistent such that if it is placed in (or assumes) the same initial pose (or perhaps one a few inches or centimeters away, but with a very similar orientation) then it will at least begin to cover the surface in the same or substantially the same manner each time (although noise and other factors discussed above, as well as changes in the position of obstacles, may affect the route ultimately taken and the manner in which the surface is covered). Other embodiments may randomly or pseudo-randomly invoke process 200 with either "cover to left" or "cover to right" first. Yet other embodiments may be configured with sensors that determine if an obstacle is proximate in the left or right direction and first cover in that direction or the other direction.

In cases where perimeter covering is not required to successfully complete a mobile device's non-navigational function (such as perhaps the dispensing of a detergent) process 100 may conclude after the region-based covering phases are completed and before invocation of perimeter covering at 150. This may result in less than complete coverage of the surface because some regions (e.g., those whose presence may be indicated by perimeter covering process 300 returning with a result of "snake created") may remain undiscovered and thus untraversed.

Region-Based Coverage

FIG. 2 illustrates an example implementation of an example region-based coverage routine or process 200. As implied by the discussion above, process 200 may have several possible starting points (e.g., at least four possible starting points (states 205, 215,225, and 250)), which are selected based at least in part on the value of a start condition. An alternative, not illustrated, is for a process such as process 200 to have a single entry point, to evaluate a start condition, and to proceed accordingly. The illustrated embodiment of the region-based covering routine 200 has two exit conditions, set at states 295 and 245.

As mentioned above, a controlling process, such as process 100, might first invoke process 200 with start parameter "cover to right", then invoke it with "cover to left", then invoke it with "cover anywhere", and then invoke it with "cover created snake". In other circumstances or embodiments the process 200 may be invoked with similar parameters but in a different order, for example as mentioned above. Also, as elaborated on below, additional or alternative parameters are used by some embodiments. For example, "cover bottom" and "cover top", "cover left at 45 degree angle", "cover first 30 degrees", etc. In general, the described left/right cleaning can be generalized with sectors spanning a defined angle. As described, the angle is 180 degrees, but sectors spanning other angles, including but not limited to 120, 90, and 60 could be supported in this fashion.

Process 200 also makes use of a variety of other parameters. One of ordinary skill in the art will understand that a wide variety of factoring and parameter passing strategies can be used.

When invoked with "cover to right" at 205, covering parameters are set at 210 so that the starting location is the initial location of the mobile device (the location component of P) and the coverage or covering direction is set to the initial orientation of the mobile device (the orientation component of P) rotated by negative n/2 radians (90 degrees clockwise). When the start condition is set to "cover to left", process 200 is entered from starting point 215, and at state 220 the covering parameters are set as the mobile devices initial location (again) and the mobile devices initial orientation rotated by positive, n/2 radians (90 degrees counter-clockwise).

A consequence of these settings is that some processes, such as those illustrated, cause the mobile device to first move in the direction in which it was placed on the surface, proceed to cover a portion of the surface on one side of the line in which it first moved, return to that initial location, and proceed to cover a portion of the surface on the other side of the line along which it first moved. Some such embodiments may be advantageously predictable, have esthetically pleasing navigation routes, and perform ancillary tasks (such as cleaning) in accordance with a user's expectation because they initially and repeatedly operate around the initial location (which may be a location of particular importance or relevance to a user).

A subset 212 of process 200 uses a starting pose SP and a covering direction D, which are established at 255. Direction D determines the orientation of the covering actions (e.g., navigating or snaking) that can be selected within the region, which in turn determines the direction in which the mobile device covers or navigates. For example, although the mobile device may move in a variety of directions, it may generally cover surface in the direction D. The starting pose SP determines the position the mobile device starts covering from. Optionally, the covering direction D and the starting pose heading (orientation) are orthogonal to each other. Another parameter that may be set at state 255 is MAX, the maximum number of regions that the mobile device should try to cover while proceeding in direction D. After initialization, at state 260 the current region is set to be Region 1.

At state 265, a covering region (initially, region 1) is created. A region is a logical structure comprising a virtual bounding box. It may be defined based on the direction D and the starting pose SP. In one embodiment, a region is created as part of the map, which stores defining parameters of the region (including, e.g., its region number, D, and SP). Regions may be static or dynamic. Some mobile devices may use both static and dynamic regions during the same covering process while other embodiments may use only one or the other during a given covering process. Still others may only ever use one or the other.

With a static region, the location and dimensions of the region with respect to SP and D may be established before the mobile device begins covering the region. For example, a static region may be defined to have a pre-defined size (such as 5 feet by 5 feet) and location relative to SP (e.g., edge-centered around SP or to have a vertex on SP). In one embodiment for mobile devices that clean floors in American homes, the static region size is preset to be about 7 m long (along the "ranks" direction, discussed in more detail below), 1.5 m wide, and edge-centered around SP (although the static region may have smaller or larger dimensions).

A dynamic region is initialized with dimensions, preferably dimensions that are expected to be relatively small compared to the dimensions of the surface (e.g., 0.5 meters by 0.5 meters for a mobile device intended to operate on the floors of American homes) and allowed to expand, perhaps to a predefined maximum size/dimension(s), so as to adapt the region according to the environment. A dynamic region may, like a static region, have a predefined location relative to SP.

Static and dynamic regions are illustrated in FIG. 15A and FIG. 15B. In FIG. 15A, a mobile device starting at pose 1530 snakes within room 1510 and is confined to static region 1510. The snake 1540 it follows shows that when it detected that it was leaving the region 1520 it moved on to the next rank of its snake, even though it was still in room 1510. In contrast, FIG. 15B shows that a mobile device following a similar path 1560 in a dynamic region 1550 will reach the south wall of room 1510 because the region 1550 expands when the mobile device reaches its southern edge but is still able to proceed into unexplored and unoccupied areas.

Map analysis related to snake frontier enumeration, selection, and/or identification may be restricted to the current region. Some embodiments may be configured so that at times they conduct a global frontier enumeration or otherwise enumerate frontiers in previously covered regions as well as or in addition to the current region. Also optionally restricted to the current region in some embodiments is the movement of the mobile device itself. Other embodiments are not so restricted, but the restriction has an advantageous result of causing a mobile device to try to cover the current region before moving elsewhere. For example, at state 270, a snake S is sought within the current region.

If a snake S meeting constraint SCI exists, the mobile device starts snaking at state 275. Other embodiments may implement a covering action (navigation) other than snaking. As the mobile device snakes, the map is updated to record, for example, locations that have been traversed, where obstacles have been detected, and where borders appear to exist. Snaking is discussed in more detail in the context of FIG. 5, below.

Different conditions can cause the mobile device to quit the snake action or other traversing action. For example, the mobile device may reach the end of the current region (e.g., the next rank for the snaking process is outside the region and the region, if dynamic, is unable to grow any further), it may reach a border of the surface, an essential signal (such as a power or localization signal) may become weak, a physical limit (such as the length of a cord) may be reached, or an obstacle may be sufficiently large or suitably arranged so as to block an entire snake rank and prevent a mobile device's navigational processes from causing the mobile device to navigate around it. When the snake action is finished, a mobile device determines what action to take next. The mobile device may do so as at state 280, by analyzing the map and identifying a suitable frontier, such as the one closest to the mobile device. An appropriate frontier preferably satisfies constraint SC2. These constraints may include having a minimum rank length (for example, one robot diameter or 20 centimeters) and having a dominant (general) direction or orientation of D. Restricting D in this way tends to result in a mobile device continuing to cover or explore in the same direction (D) as before. Some embodiments may select a frontier with dominant direction other than D, including directly opposite to D. Some embodiments may do so only if that frontier has a minimum rank length longer than any frontier having a dominant direction of D.

An embodiment may advantageously explore a region with a dominant direction other than the current dominant direction because sometimes the only way to enter a region is from the a particular initial vector.

If at least one such frontier passes/satisfies constraints SC2, a "valid" snake action exists and it is selected as the candidate S for a next loop to state 270. If no such snake exists, then if the current region is not MAX (e.g., if the embodiment's limit for the number of regions for that invocation of process 200 has not been reached), the covering region counter is incremented at state 290 and a new region with a new bounding box is created at state 265. The new bounding box and other constraints may limit subsequent map analysis and snake action as just described.

If the mobile device has already reached the maximum allowed regions MAX at 285, then progressive region covering terminates at 295 with a status of "region covered". Some embodiments may have a system level MAX, such that the total number of regions created cannot exceed it, while others may have a MAX for particular invocations of progressive region-based covering, or have none at all. Some embodiments may impose a MAX of one type or the other for performance reasons, such as to limit the amount of memory consumed or the processing time required. Limits on MAX may result in a lower degree of coverage, if other properties (such as the size of regions) are not adjusted accordingly.

When process 200 is invoked with start parameter set to "cover anywhere" at state 225, the mobile device also analyzes the map to identify suitable frontiers at state 230. Potential frontiers are evaluated against constraints SCI at state 235. A frontier is selected (e.g., the closest to the current location of the mobile device or the one that would be least expensive to reach given an expense calculating or approximating function such as power consumption or time to reach) and corresponding initial parameters are set (based, for example, on the properties of snake S, the current pose of the mobile device, and the status of the map) at 240. Processing then proceeds per subset 212 at state 255. Depending on the parameters set at 240, the starting pose SP may be the current pose of the mobile device at the time, and the direction D may be set to any value, including for example the previous D, the current orientation of the mobile device, or the dominant direction of the frontier to be explored.

Constraints SCI and SC2 may limit the mobile device to ensure good localization or other behavior. For example, appropriate constraints can contribute to a mobile device cleaning broad open areas of the surface in proximity to the starting location before exploring areas with more limited accessibility and/or which are further from the starting location. Constraints SCI and SC2 may include a length restriction, such that a snake must have an initial rank length of at least a certain threshold, such as 20 cm, 1 meter, or other values (or, e.g., a mobile device diameter, 1.5 or 2 mobile device diameters, or some other multiple of a mobile device diameter). Constraints SC1 and SC2 may or may not include orientation restrictions. While constraint SCI may or may not have a minimum length, it advantageously has one that is longer than that of a length constraint of SC2 if SC2 has a length constraint. For example, if an embodiment has a minimum SC2 length check of 0.5 meter then that embodiment may preferably have an SCI length check of 1.5 meters. There need not be a correlation between the two length checks, but in some embodiments the minimum length for SC2 will correspond to be approximately the diameter of the mobile device (or approximately the largest cross section orthogonal to the direction of movement) and in some embodiments the minimum length for SC1 will be approximately three times that measure. In other embodiments his ratio will be different, and in other embodiments there may be no such correlation.

Having the length requirement for SC1 be larger than that for SC2 helps account for the observed possibility that errors in localization or mapping that have accumulated during subset 212 might result in the map indicating that small snake frontiers exist even though, in fact, the mobile device has already covered those portions of the surface. On the other hand, during subset 212, selecting smaller frontiers has been observed to help ensure the mobile device more completely covers accessible portions of the surface and helps reduce the presence of frontiers in the map that might otherwise be addressed by subsequent processing.

Recall from FIG. 1 that states 135 and 140 are repeated in the illustrated embodiment so that process 200 is invoked with start parameter "cover anywhere" until no snake S satisfying SC1 (or optionally less than a threshold number of snakes satisfying SCI) is found and process 200 exits with condition "no frontiers". Thus, the mobile device continues to select frontiers from the map while at least one such frontier exists.

Illustrated process 200 may also be invoked at state 250 with start set to "cover created snake" if a snake is found during perimeter covering. The parameters for covering may be set as they are when a snake S is found during state 235.

What has been described so far and what is illustrated in other figures implies regions of rectangular shape, the present methods and systems may be applied to regions of any shape. For example, the surface can be divided in three or more regions radiating out of the initial mobile device location. In such an example, the terminology "cover to left" and "cover to right" would be modified to something such as "cover sector n", where "n" identifies a sector. Other parameters, such as orientations, region dimensions, and minimum lengths, may also be adjusted to account for the changes in geometry in these circumstances.

Snaking Action and Navigation

Above, references have been made to snakes, snaking action, and establishing snake parameters. For example, in state 275 of process 200 in FIG. 2. Snaking action may be implemented by a process such as process 500 illustrated in FIG. 5.

Generally, snaking action (snaking) may optionally be limited by the current region. Also, as the mobile device traverses the surface, a map is updated with information including but not limited to some or all of the following: location of obstacles, traversed portions of the surface, hazard portions (e.g., changes in surface material, altitude changes, locations of high wind or with a particular chemical presence, or other characteristics that may constitute a hazard for a given embodiment), the presence/absence of a localization signal, and/or the like.

The input parameters to the illustrated snaking process 500 may include the snake origin location and orientation, the direction (heading or orientation) of a desired snaking action, and the initial length and spacing of ranks. In the illustrated embodiment, the snaking direction and snake origin orientation are with respect to a single global map. These parameters, such as may be used in an example embodiment, are illustrated in FIG. 6. A region with boundaries 610 has been established. The origin pose of the snake (i.e., the orientation of the mobile device at the beginning of the snake action) is at pose 620, which is set, without loss of generality and to simplify the disclosure, to have a logical north orientation. Other orientations, including south, east, west, and oblique, may also be used. The illustrated ranks 630 are orthogonal or substantially orthogonal to the axis of the initial pose, but other embodiments may have ranks which run oblique or even parallel to the axis of the initial orientation. In such circumstances, certain of the directions and other parameters referenced in FIG. 5 and the associated discussion of that figure would change accordingly. The ranks 630 are parallel to each other and, in the illustrated embodiment, evenly spaced with rank spacing 650.

In some embodiments the rank spacing 650 is approximately 0.5 meters. In other embodiments ranks may have a defined but non-constant spacing. Rank spacing 650 may be related to the dimensions or functional properties of the mobile device (e.g., the suction range of a mobile device vacuum or the dispersant range of a mobile device seeder) such that the portion of the surface affected (traversed or operated upon) by the mobile device while following one rank overlaps with the portion of the surface affects while following the next rank. Overlap may, depending on an embodiment, be greater or lesser and may depend on context. For example, if a sparse coverage is desired, such as during some types of planting or perhaps when distributing a material that will disperse into the environment, the rank spacing may be greater, such as 1.5 or 2 times (or more) the size of the mobile device or 1 or 2 meters. If repeated treatment of a surface is advantageous or not harmful, such as when mowing a lawn, for example, then rank spacing may be set to a lower level, such as 0.25 meters or less. In some embodiments, such as those that are illustrated, a smaller rank spacing may result in coverage requiring more time and/or more computational resources. Rank spacing may also be relative to one or more mobile device dimensions, such as 0.25, 0.5, 1.0, 1.25, 1.5, or 2.0 times a dimension.

The length of a rank is measured along the direction 640 orthogonal to the direction of rank spacing 650. Arrows 660 indicate the direction along the rank a mobile device will travel when snaking. Thus, the mobile device in FIG. 6 may proceed north to Rank 1, turn 90 degrees clockwise, and proceed along Rank 1 until the region boundary 610 is reached. The mobile device may then rotate 90 degrees counterclockwise and travel until it reaches Rank 2. At that point the mobile device may rotate 90 degrees counterclockwise and proceed to travel along Rank 2. In this fashion the mobile device "snakes" along the ranks, traversing each rank in the opposite direction of the way it traversed the previous rank and generally progressing in a northerly covering direction. This example of snaking action, which is but one navigational strategy an embodiment may use to traverse a region, is elaborated upon in the context of FIG. 5.

Figure 5A:
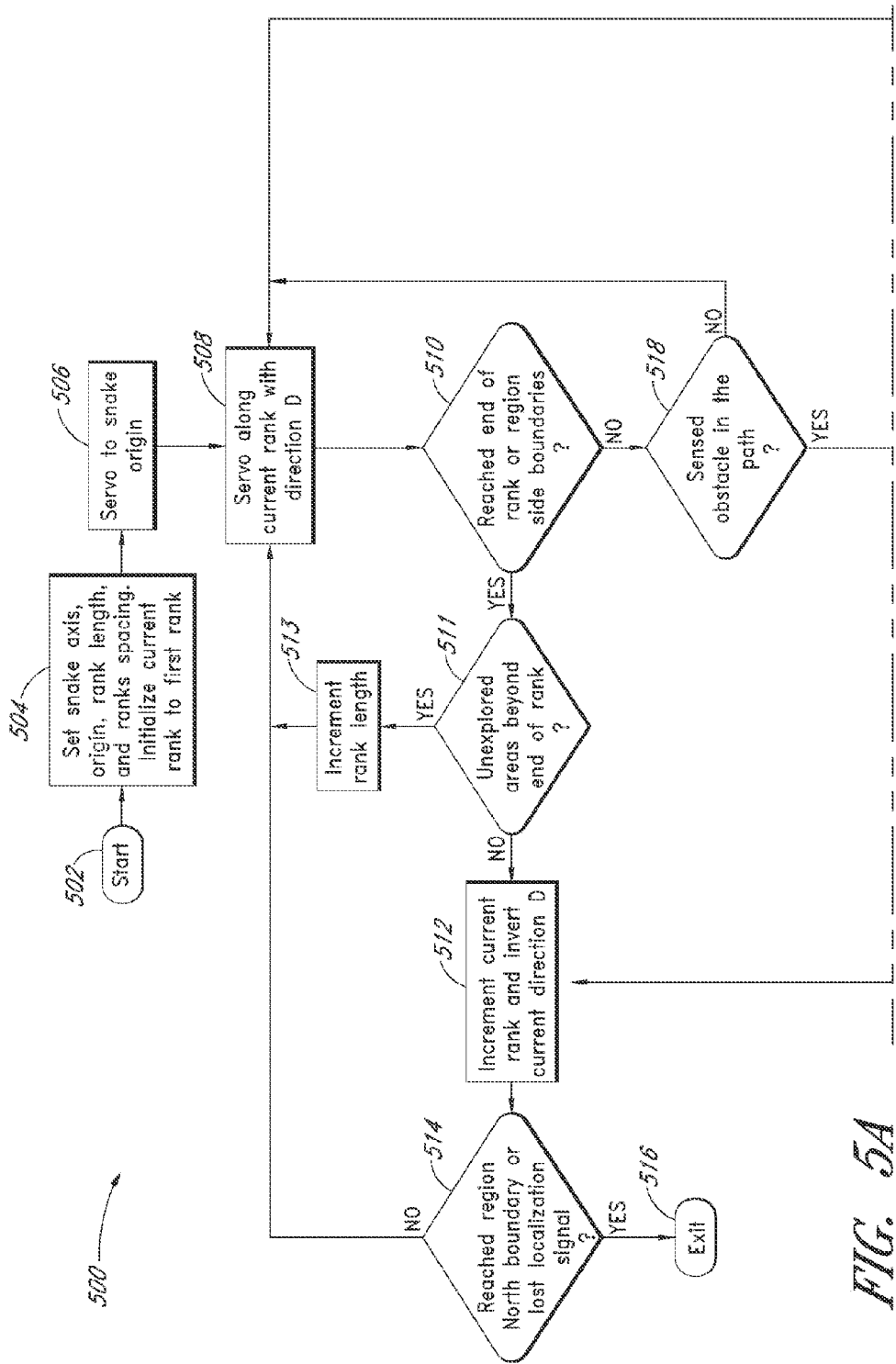
FIGS. 5A-5C is a flow chart illustrating an example of a process an embodiment may use to navigate in a region or along a portion of a perimeter, such as when performing the processes illustrated in FIG. 2.
Figure 5B:
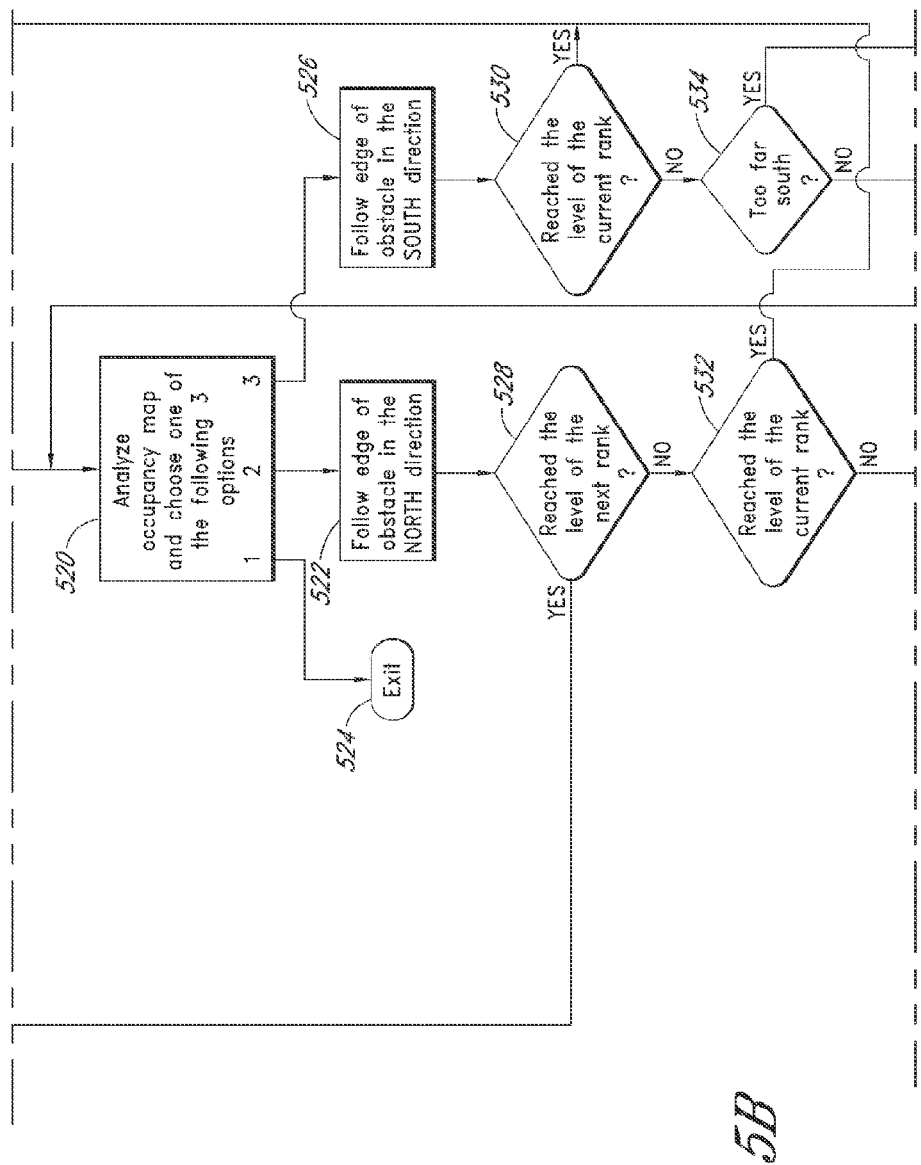
Figure 5C:
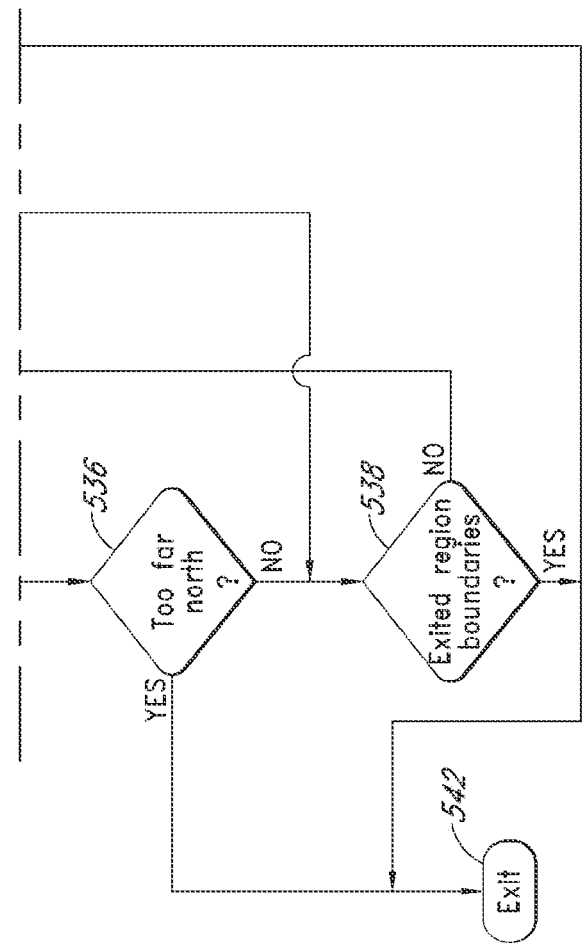
Figure 6:
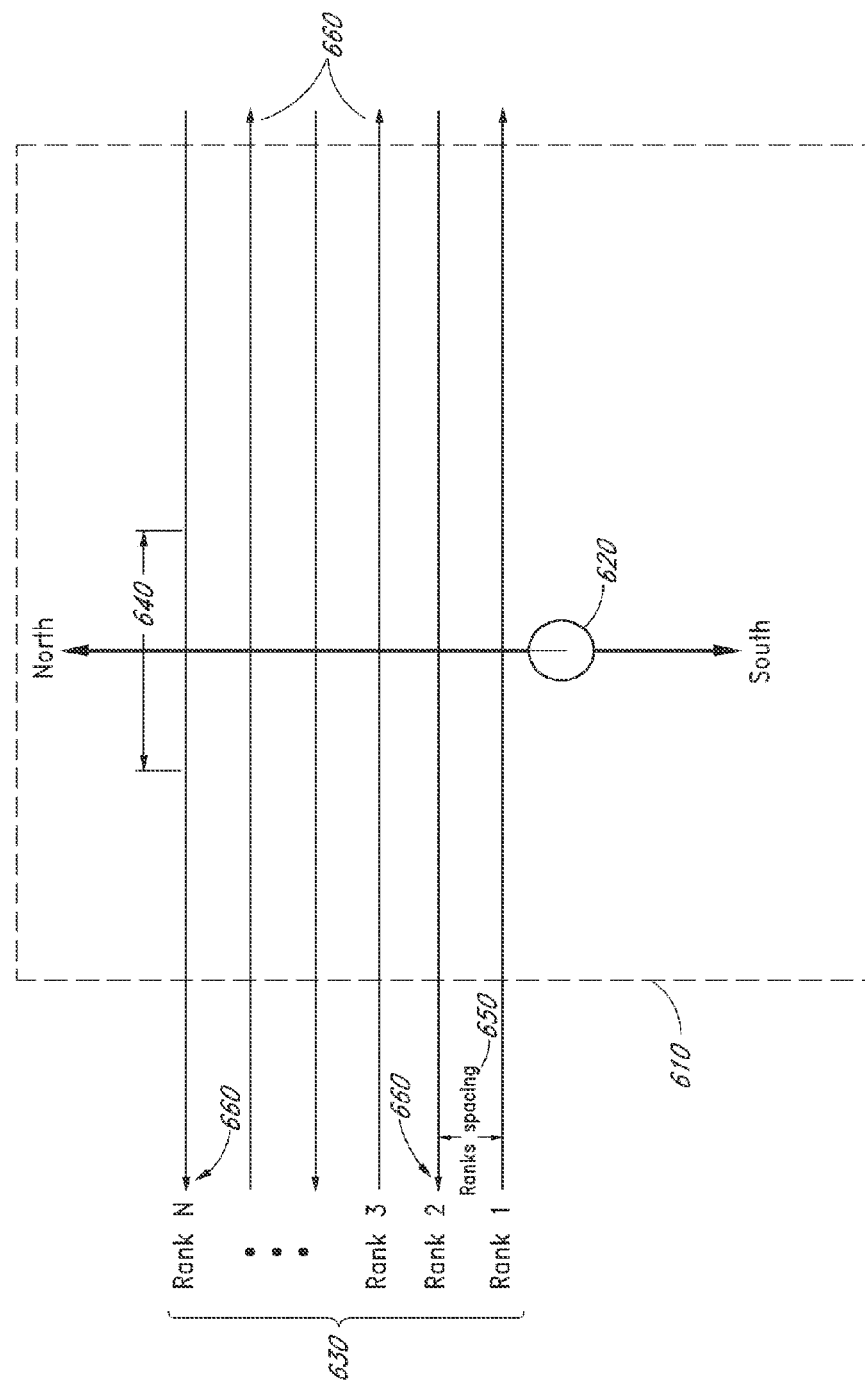
FIG. 6 illustrates some of the terminology used herein with an example of a "snake" along "ranks" in a "region".

Turning back to FIG. 5, which is decomposed into FIGS. 5A, 5B, and 5C, an example of a snaking action process is outlined. At state 502 the routine starts. In state 504, the snake parameters are set and the current rank is set to the first rank. In state 506 the mobile device moves to the snake origin pose if the mobile device is not already there. In state 508 the mobile device moves along the current rank in the direction of traversal associated with that rank. As mentioned below, in some embodiments the movement of mobile device may not be directly along the current rank but may generally follow it while moving above and/or below the rank. In state 510 the mobile device checks if it has reached the end of the rank or crossed a boundary of the current region. If either condition is true, in state 511 the map is analyzed to see if the portion of the surface beyond the end of the rank is unexplored.

If the condition is true, and the mobile device has reached the end of the rank but not a boundary of the region, the current rank length may be extended by a predefined increment in state 513 and the routine loops back to state 508 to continue moving along the, now longer, current rank. The rank length increment need not be predefined and may, for example, be based on a previous length increment, the previous length of the rank, the distance between the current end of the rank and a border of the region, or the like. In an embodiment with dynamically sized regions, the length of the region may be similarly extended at state 513 if a region boundary is reached. If a rank cannot be extended at state 513, then a frontier may be defined. Subsequent analysis of the map, such as in the processes described above or in the perimeter covering process described below, may expose that frontier for snaking, or it may be explored during the performance of those processes.

If condition 511 is false (because, e.g., the portion of the surface beyond the end of the rank was part of a previously explored region or is an identified obstacle), then in state 512 the current rank is incremented by one and the direction of traversal is inverted with respect to the previous direction. In some embodiments, rather than move to the next rank, the mobile device may instead skip a rank and move to the second or even higher rank. In state 514 the mobile device checks for exit conditions, including having crossed the top (e.g., logical North) region boundary or having lost a localization signal during the current rank traversal. If any (or a specified subset) of such conditions is true and cannot be remedied (e.g., by dynamically growing the region or by using an alternative signal or means of localization), the routine exits in state 516 and returns, e.g., to the region covering state 280 of FIG. 2. In some embodiments, the critical checks of state 514 are run on an interrupt basis or on a scheduled basis, as well as or instead of at a set point in the performance of a process such as process 500. If condition 514 is false, the mobile device continues along the current rank per state 508.

If condition 510 is false and the mobile device has been moving along a rank, then it is possible it has encountered or sensed an obstacle. This is checked for at state 518. If condition 518 is false (no obstacle is sensed), the mobile device continues moving along the current rank per state 508. However, if condition 518 is true, then a navigation method such the illustrated snaking handles the detection of an obstacle in one of three ways, based at least in part on an analysis of the map at state 520. The illustrated options are (1) to exit process 500 at state 524, (2) to follow the edge of the sensed obstacle in the logical north direction at state 522, and (3) to follow the edge of the sensed obstacle in the logical south direction at state 526.

The decision at state 520 can be made using many different criteria. In one embodiment, one of the three options is selected using predefined probabilities so that each is selected approximately ⅓ of the time or another predefined proportion. In another embodiment, a random or pseudorandom algorithm may determine which option is selected. In yet another embodiment, the probability of selecting an option changes over time based, for example, on previous results (e.g., if that option leads to continued snaking, then the probability of choosing that option in the future is increased, and if that option leads to exiting the snake, then the probability of choosing that option in the future is decreased). In another embodiment, the map is analyzed to simulate several possible paths or routes, both north and south, that would take the mobile device from the current location (i.e., the one at the edge of the obstacle) to navigate around the obstacle to either rejoin the current rank or to traverse to the next (higher) rank (if, e.g., the obstacle extends the remainder of the traversable length of the current rank). Various criteria, including the geometric length of the path and the resources consumed during the route (in terms of time, computational resources, and power, for example), can be used to select a desired path, and thus whether to proceed north in state 522 or south in 526.

At state 528 the mobile device checks if, while following the edge of the obstacle in the north direction, it has intersected the next rank. If it has, the routine loops back to state 512. In other embodiments the mobile device may remember this location on the next rank and continue around the edge of the obstacle until another indicator is reached, such as the second rank up, a region boundary, or an indication that the obstacle is extending deeper into the region and the mobile device is therefore moving, for example, east when it was moving west when it originally encountered the edge. At each such decision point (or at a subset of decision points), some embodiments may decide to continue trying to go around the obstacle and some embodiments may return to the remembered location. If the mobile device is able to return to the original rank in such an embodiment, or if, as in state 532 of the illustrated embodiment, the mobile device reaches the current rank before reaching the next rank, process 500 resumes at state 508, where the mobile device rejoins the current rank and continue moving along it.

If condition 532 is false (implying the mobile device is between the current rank and the next rank), the mobile device checks if, while following the obstacle's edge in an initial northerly direction, it has travelled too far north, meaning the travelled distance in the north direction has surpassed some predefined threshold such as ⅔ of ½ of rank spacing. If condition 536 is true, the routine exits at state 542; if false, the mobile device checks for having crossed the region boundaries in state 538. If the mobile device has crossed the region boundaries, then the routine exits at state 542.

In other embodiments, the mobile device might not exit the routine 500 if 536 or 538 is true, but may instead navigate back to the location on the original rank at which it encountered the obstacle, or any other valid location within the region and not too far north, and return to state 520, making a decision based on the new information gained and recorded in the map. In the illustrated embodiment, if the test at 538 is false then the mobile device remains where it is and the routine loops to state 520, where the map is analyzed in light of the new mobile device pose and new information added to the map during the recent navigation. In other embodiments, the mobile device may return to any of the traversed locations between the current one and that where it first encountered the edge before resuming the routine at state 520.

Similar and analogous states may be followed if option (3) is chosen at state 520 and routine 500 causes the mobile device to follow the edge south in state 526. In state 530 the mobile device checks if it has intersected the current rank. If the mobile device has intersected the current rank, the routine loops back to state 508; if it has not, the mobile device checks in 534 if it has travelled too far south which may be defined analogously to too far north (although some embodiments may use different definitions for too far north and too far south). Too far south may also be defined as having reached the previous rank. If the mobile device has moved too far south, the snaking routine 500 exits at state 542; if it has not, the mobile device performs the previously described check at 538.

Other strategies may be deployed to navigate within a region so as to cover it. For example, a mobile device may chart a path corresponding to a circle, square, or other geometric shape that spirals outward from an origin point. Also, for any navigation method with an underlying path tactic (e.g., ranks or the spirals of a spiral shape, a mobile device may follow that path in a variety of fashions. It may, for example, follow the path as discussed above and elaborated on below. A mobile device may also deviate off the path in either direction (e.g., "above" or "below"). For example, it may sweep out a sinusoidal pattern centered or substantially centered on the path, or a vine-like motion described by alternative back and forth motions, biased in the direction of the path, such that on average the mobile device moves along the path. In some embodiments that deploy these navigational strategies, the mobile device is generally following the path, while covering parts of the surface not directly on the path, perhaps for reasons associated with the functionality of the mobile device (e.g., sweeping or mopping) or for limitations imposed by the mobile device's locomotive capabilities. Embodiments may implement a number of variations of this basic snaking routine. In some embodiments that deploy a snaking strategy, instead of linearly following a rank, a mobile device may follow it on average, but traverse above or below a rank. These and other motions can be used to cover a region.

Perimeter Following/Covering

FIG. 3 illustrates an example process for an embodiment of a perimeter following routine 300. Some embodiments may invoke routine 300 at least in part because following the edges of previously discovered obstacles and/or the surface borders has a functional value. An example is a mobile device configured to perform dusting with an electrostatic pad. Performing perimeter dusting towards the end of the dusting (covering) process allows the mobile device to collect any dust or debris that was pushed towards the perimeter during the course of region-based cleaning. Another example of perimeter covering's functional value is that it can help appropriately configured devices clean baseboards and the bottoms of furniture.

Some embodiments may invoke routine 300 to help obtain more complete coverage through discovery of previously unexplored portions of the surface. For example, in cluttered rooms the layout of the accessible and traversable portions of the floor is such that large traversable portions of the surface are accessible only by small connecting portions that are just slightly wider than the width of a mobile device. During perimeter covering, portions of a surface, such as some of these small connecting portions that may have been missed during the region covering phases, are identified. If such portions are identified, the mobile device may explore them by entering into a new snake covering routine. One way such connecting portions may be missed, for example, is if they occur between two ranks at the opposite end of the ranks from the end where the mobile device moves from the first rank to the second rank. Perimeter covering is also an opportunity to discover if previously identified obstacles have been moved or removed.

Recall from the discussion of FIG. 1 that perimeter covering may be invoked by the illustrative covering routine 100 at state 150, after analysis of the map indicates that there are no further frontiers to explore (e.g., region covering process 200 has exited at state 245 with exit condition "no frontiers"). At this point, the mobile device has typically constructed a map of most of the surface after having performed region based covering in it. The mobile device begins the perimeter covering phase 300 by analyzing the map and enumerating frontiers satisfying constraint PCI at state 310. Constraint PCI describe frontiers which are eligible for perimeter covering. For example, PCI might be such that it includes frontiers that are between explored and occupied locations and/or explored and unexplored locations (e.g., locations not traversed during snaking) which have not been perimeter-covered and which are within the surface.

Constraint analysis is performed against the surface as known by the mobile device or other processor. For example, it may be performed against or using a map. A map may have mark location on the surface in discrete cells of some defined size. The size of a cell, which can vary from embodiment to embodiment, may range from 0.5 cm or smaller squares to 0.5 meter or larger squares, depending on the context (including the functions of the mobile device, the environment, and the sensors on the mobile device, for example). Cells need not be square, or even regular, but may be circles, rectangles, hexagons, or other closed shapes. In some embodiments, it is these cells that are associated with properties such as occupied, explored, and the like.

Although other embodiments may use other structures for maps, this nomenclature of cells with properties helps illustrate another possible limitation in PCI, which is based on length as determined by cell count. When performing the analysis at state 310 the mobile device may begin its analysis at a start pose P and proceed along the frontier, counting the cells on the frontier that have not been covered. If the count reaches a number indicated by the limitation in PCI, and the other limitations of PCI are met, the mobile device has found a frontier, starting at P, that satisfies PCI. This is one way a map cell count can be a proxy for a length parameter. Other analyses disclosed herein may also be performed using the map and based in whole or in part on information in the map.

PCI may also have minimum length requirements, similar to those of SCI and SC2 (e.g. less than ¾ of the diameter of the mobile device, 20 cm, a mobile device diameter, etc.). These values may also be stored, in the SC and PC constraints, as cell counts. Benefit of having a minimum length constraint or limit in the constraints include, but are not limited to, avoiding exploration of small or insignificant open spaces, avoiding interrupting a covering routine to cover a small region (because, e.g., doing so may look unexpected to an observer), and accounting for noise in the map (e.g., small gaps in the map that result from sensor deviations and which may indicate map frontiers that do not correspond to frontiers in the actual surface).

Unexplored regions may be treated similarly to occupied portions of the surface in this analysis for at least two reasons. One is that the mobile device may have only sparse information about obstacles due to the traversal path of the mobile device during region based covering. Another is that some embodiments may implement perimeter covering to explore previously unexplored portions of the surface. Unexplored portions of the surface may be reasonably likely to contain obstacles (e.g., they are often unexplored because they are proximate to obstacles) and if they are not completely comprised of obstacles then exploration into those portions of the surface is desired in some embodiments, such as those seeking to maximize coverage.

At state 315, a decision is made based on whether the frontier enumeration of state 310 enumerated or identified any frontiers satisfying PCI. If no suitable frontiers are found then the perimeter covering routine 300 terminates with ending condition "no perimeter frontiers" at state 370. In illustrated process 100, this leads to the termination of that run of the covering process 100 at state 160. If frontiers are found, a frontier Fri which optimizes function Fn1 is selected for covering at state 320. Fn1 is a costing or ranking function which may optionally be similar to those that have been previously discussed.

For example, the ranking function may rank the identified or enumerated frontiers based on parameters including distance from current pose of the mobile device to the frontier or cost in power or time to reach the frontier, frontier length (where a longer frontier may receive a heavier weight), and/or quality of a localization signal along the frontier (e.g., where better quality signals may receive a higher weight, but in some embodiments a lower quality signal may be selected first if, for example, the ability to process a weak signal degrades the longer the mobile device operates). The top ranking frontier according to Fn1 is covered first. Other embodiments may be select from the available frontiers at random or in other fashions. One embodiment uses distance to the frontier as the only factor; other embodiments may use combination of other parameters.

Once a frontier is selected in state 320, at state 325 the mobile device navigates to the starting location of the frontier and engages in perimeter following or covering at state 330. Once in perimeter covering mode, the mobile device executes a loop comprising states 335, 340, 345, 350, and 355. The mobile device follows the perimeter at state 335 while periodically evaluating the frontier originating from the current mobile device position at 340 to determine when to terminate perimeter following. Following the perimeter, in some embodiments, is performed by using sensors associated with the mobile device to detect the source of the perimeter (e.g., a weak signal or a physical obstacle) and to navigate along that source, for example by repeatedly moving against that source and away from it, with a bias tangential to the source. This is one way in which a mobile device may update, correct, or otherwise augment information in the map. For example, if the map falsely indicated that location was occupied, some embodiments' perimeter following might correct that data because the process of following the source of the perimeter will cause it to move into logically occupied locations.

At state 340, the mobile device examines the frontier originating at the current mobile device location to determine if its previous action has created a frontier which is suitable for region based covering according to previously discussed constraint SCI. In some embodiments, a constraint other than SCI may be used in state 340. If the frontier satisfies the constraint then the perimeter covering routine 300 ends with condition "snake created" at 365 and control may pass to region based covering with start condition "cover created snake" per states 140 and 250 of processes 100 and 200, respectively. Otherwise, perimeter covering continues per state 335.

FIG. 3 shows that states 350 and 355 occur next after state 345 if the constraint is not satisfied. Some embodiments may operate this way. More generally, states 340 and 345 and states 350 and 355 are run periodically while the mobile device continues to cover the perimeter per state 335. For example, states 340 and 345 and states 350 and 355 may run at set times or after the mobile device has moved a specified distance. The pairs of states may alternate regularly, multiple iterations of one pair may run before an iteration of the other pair, or the pairs of states may be performed in a more complicated pattern or according to another algorithm.

In any case, at state 350 the mobile device evaluates the frontier originating from the current mobile device's current location according to constraint PC2 to determine if the frontier perimeter covering should continue. Constraint PC2 may be like constraint PCI in that it selects frontiers between explored portions of the surface and occupied and/or unexplored portions, which have not been previously perimeter covered, do not leave the map, and are not in portions of the surface in which the mobile device does not detect sufficient localization signal, for example. A difference between the two constraints may be that PC2 is less strict than PCI. For example, PCI might select only those portions of the perimeter that are at least a meter long, while PC2 might simply select those that have a shorter distance, such as 20 cm, or one or two map cells, ahead of them that have not been perimeter-covered. In this way, the perimeter covering routine, once it identifies a perimeter portion that satisfies PC1, will continue on that portion so long as it satisfies PC2. Some embodiments may do this for the purpose of hysteresis—if PC1 and PC2 were the same or not sufficiently different, then perimeter covering might halt once sufficient portions of a perimeter had been covered so as to make PC1/PC2 fail and relatively little of the perimeter would actually be covered by perimeter covering.

When the mobile device begins to cover portions of the perimeter it has already covered, attempts to traverse a border of the surface, or approaches a previously discovered portion of the surface known to have a poor localization signal (for example), constraint PC2 will begin to fail, and at state 355 the mobile device will decide to terminate at state 360 with ending condition "perimeter covered". In this case, some embodiments of a control process 100, such as the one illustrated, will check to see if region based covering is possible anywhere in the map or surface by invoking region based covering with start condition "cover anywhere", such as state 140 of process 100 invoking state 225 of process 200.

Example of Room Coverage

Figure 7:
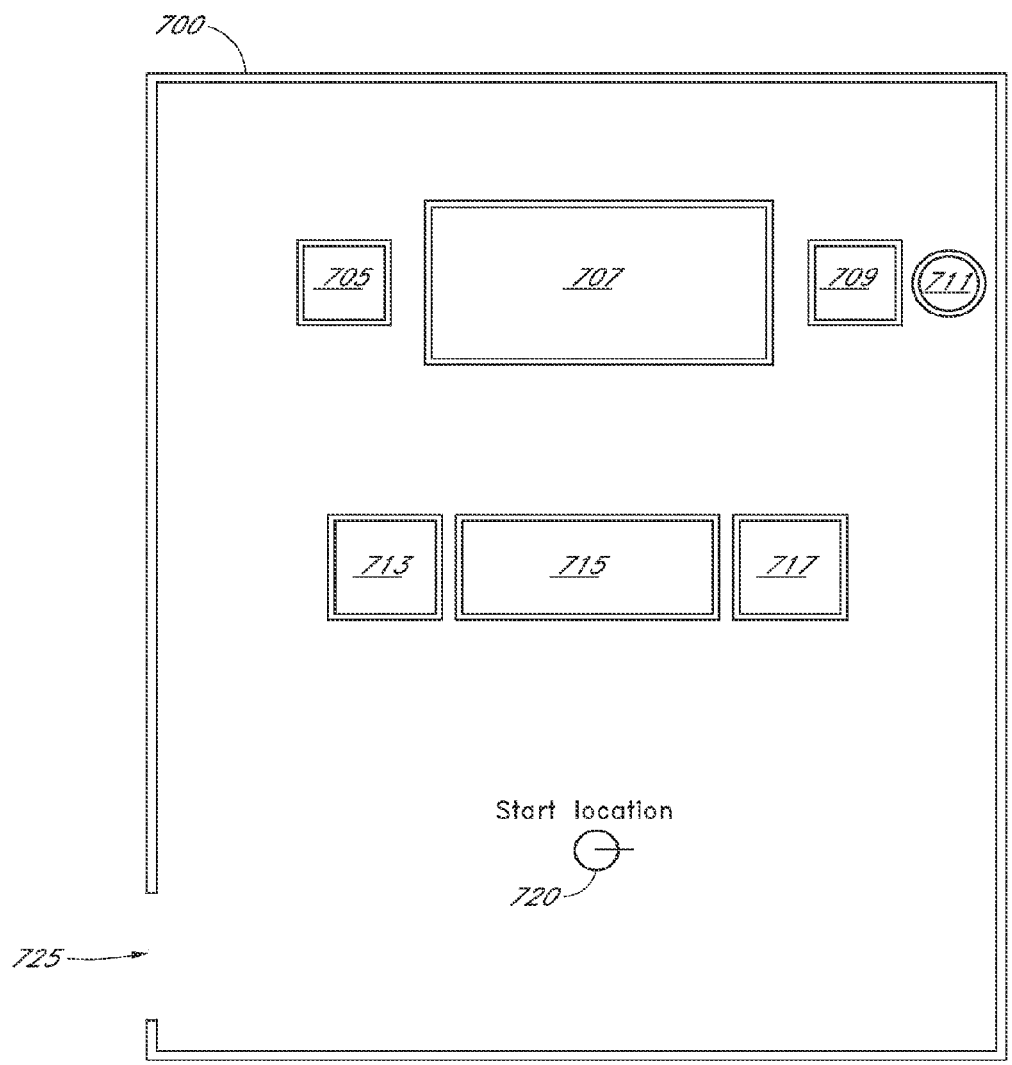
FIGS. 7-14 illustrate an example application of processes such as those illustrated in FIGS. 1-3 and 5 to an example environment.

FIGS. 7 through 14 show an example of a mobile device covering according to the present disclosures. FIG. 7 shows a top view plan of a room 700 containing some furniture (705-717) inside and a mobile device at initial pose 720. The mobile device has been placed on the floor and instructed to start the covering (e.g., via direct interaction with the mobile device such as by pressing a button or using a remote control, or via indirect action such as a timer or a programmatic interface). State 110 of the covering routine 100 is executed. The map is essentially empty of content and in some embodiments the map has no cells. In other embodiments the cells are all uninitialized or marked as unexplored. The mobile device has no or substantially no information about the room layout and the location of the furniture.

Figure 8:
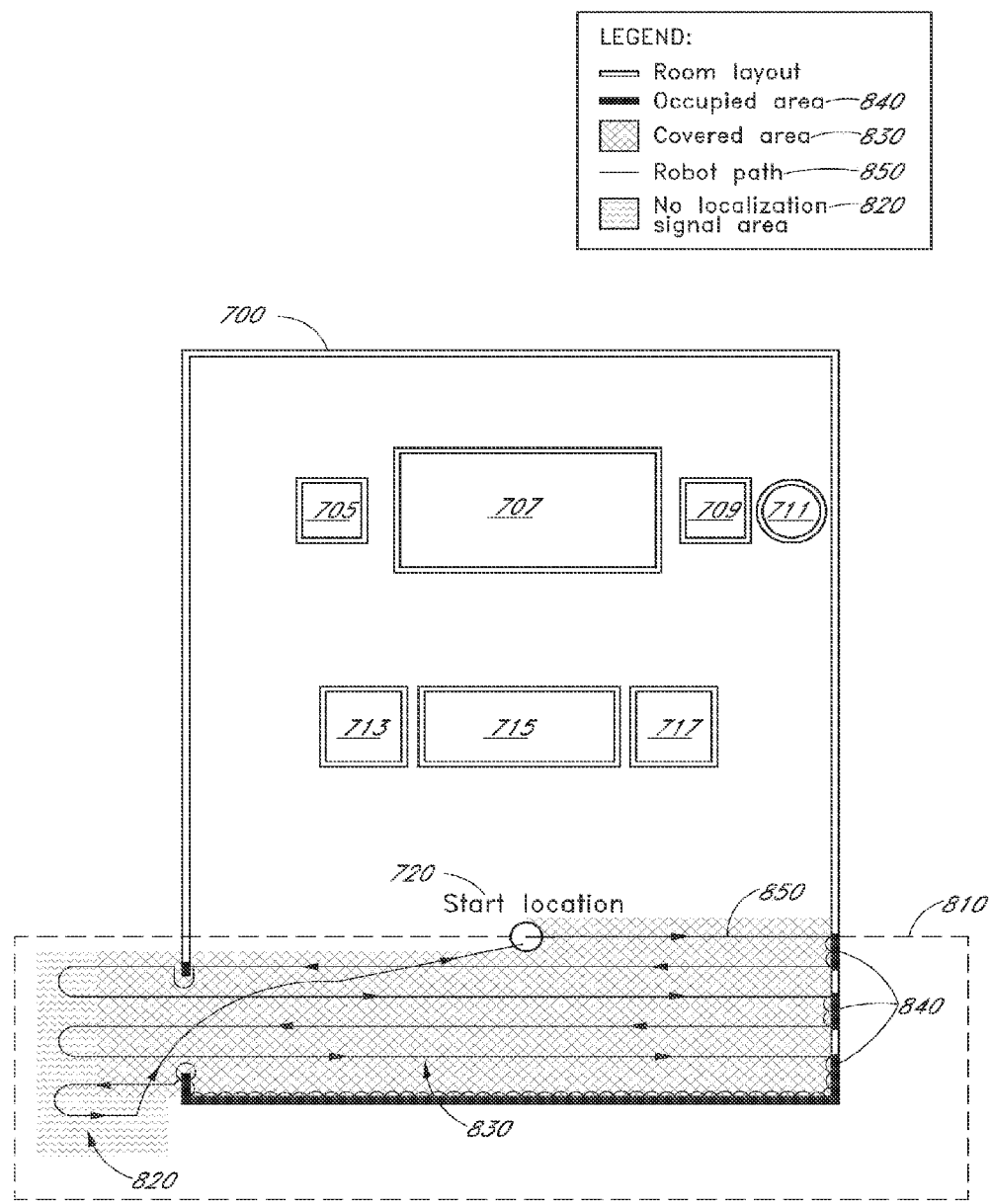

Referring to FIG. 8, the mobile device executes state 120 and invokes region covering with "cover to right". According to process 200, a bounding box 810 for a region 1 is established. The boundary 810 is shown as a dashed line and happens to extend beyond the room's 700 borders. The mobile device executes a snaking action that results in it following path 850. As the mobile device travels along the current rank it enters information in the map about the portions of the region that it was able to traverse without bumping into obstacles (marking those locations 830 as covered/traversed). When the mobile device bumps into or otherwise detects an obstacle such as a wall or furniture, it marks the estimated location of the obstacle 840 as occupied and follows the edge of the obstacle until it reaches the next rank. The mobile device then travels along that rank in a direction opposite to the previous rank direction of travel.

As shown in FIG. 8, the mobile device travels outside of the room 700 through a door 725, but it is able to detect that it has left the room because a localization signal becomes attenuated below a predefined threshold in surface portion 820. When this is detected, the mobile device turns/rotates around. In one embodiment, sensing localization signal attenuation is implemented by measuring the level of one or more infrared localization signals that are projected onto the ceiling of room 700 and detecting that the level has decreased below a predefined level. In another embodiment, the user can place a "virtual boundary" in the proximity of a door, for example as illustrated if FIG. 17 and discussed in the contact of that figure, below.

The mobile device completes covering region 1 and exits the region covering routine because there are no more snake frontiers to cover into. The frontiers along the left and right walls of the room 700 (indicated as the non-filled room borders within the region 810) do not satisfy the relevant SC2 criteria because they are too small, and the frontier along the top of the region does not satisfy the criteria because it is in the wrong direction (i.e., map analysis or other analytics show it to open in the north direction, but mobile device is currently exploring in the south direction).

Figure 9:
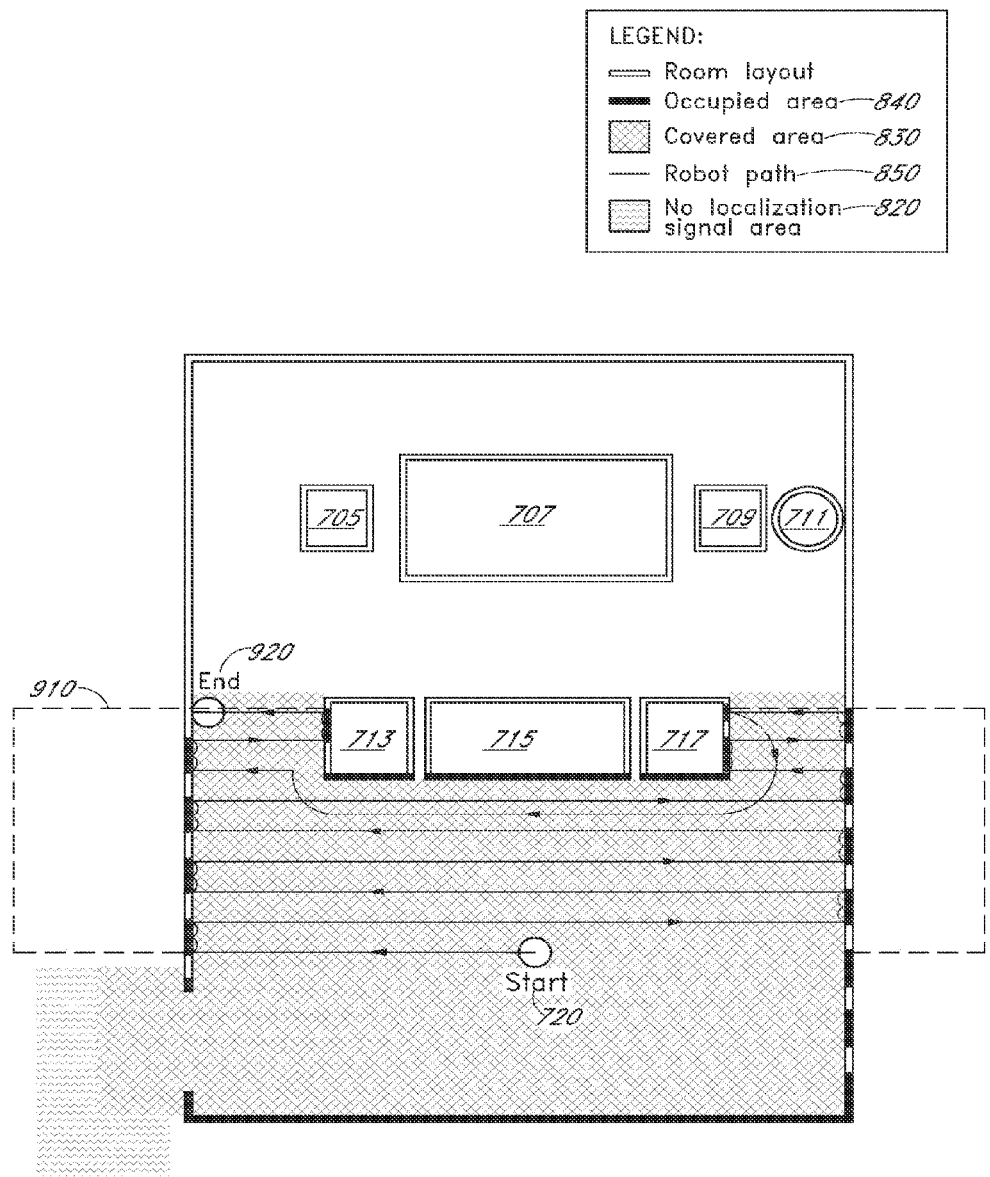

The mobile device then proceeds to state 130 and invokes region covering with start condition "cover to left". This is illustrated in FIG. 9. A new region 1 is established with bounding box 910. The snaking action ends with the mobile device at location 920 when the mobile device reaches the top of the bounding box for region 1 and there are no more internal frontiers that can be covered by snaking.

Figure 10:
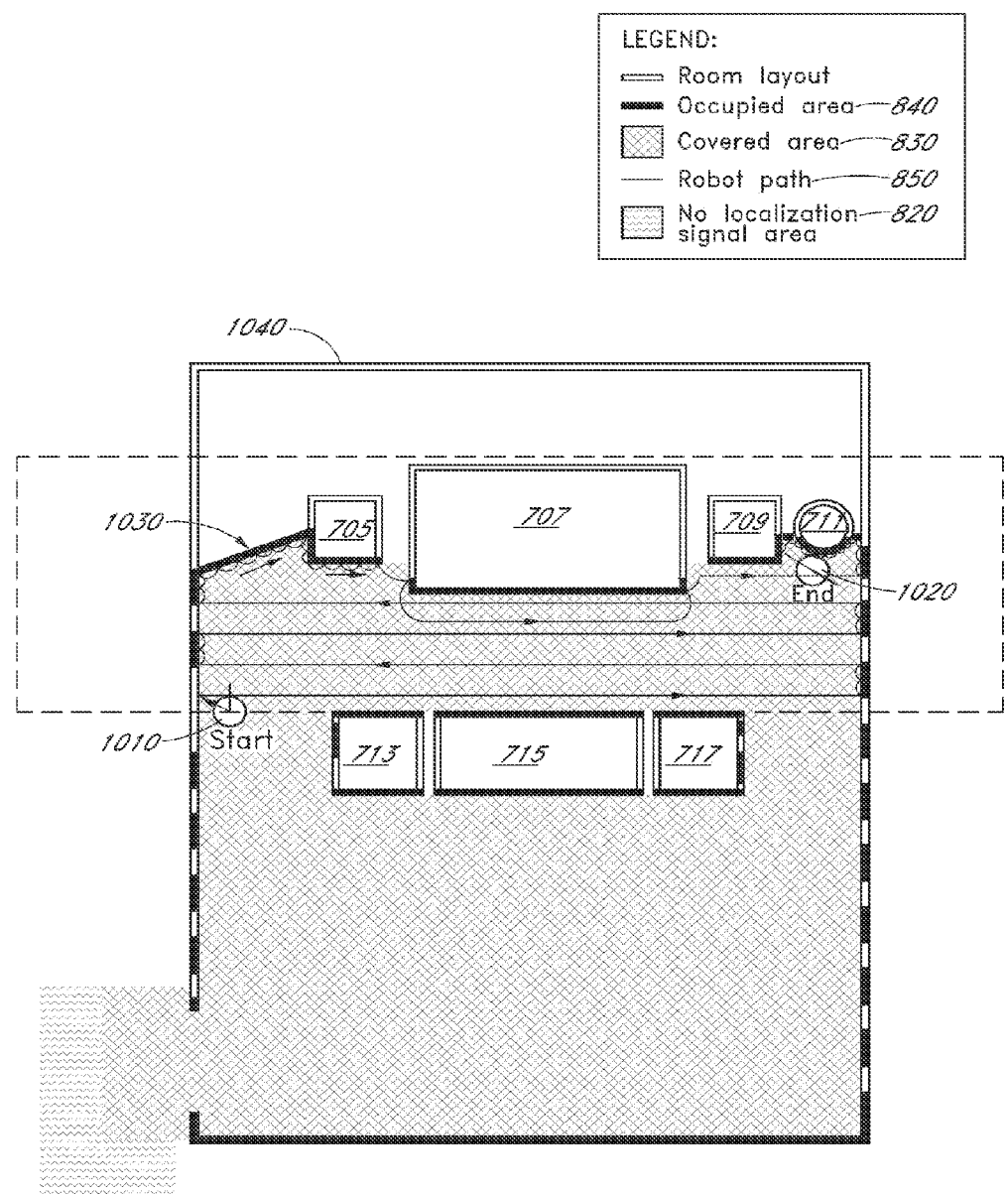

FIG. 10 illustrates an example of the mobile device and map as the mobile device covers a second region (a region 2) during the execution of regional covering invoked with "cover to left". This figure shows that while covering to the left of obstacle 705, an interference in the localization signal causes the mobile device to improperly record the location of the wall 1040 in the map. A similar effect could have other causes, such as a degrading localization routine or a mechanical malfunction that temporarily causes the mobile device to move at an angle instead of vertically (a malfunction that is remedied, perhaps, by the mobile device bumping into obstacle 705). A similar effect may also result if a person, pet, or other transient obstacle is present. In any case, the map indicates, erroneously, that 1030 is not a frontier but is an edge of an occupied portion of the surface. As a consequence of that error, the mobile device terminates region covering even though there is still some portion of the surface in the region that can be covered. The mobile device then performs state 140, but exits with end condition "No Frontiers" upon analyzing the map and determining that there are no more frontiers to be covered (because, again, none of the potential frontiers are sufficiently large to meet the relevant criteria).

Figure 11:
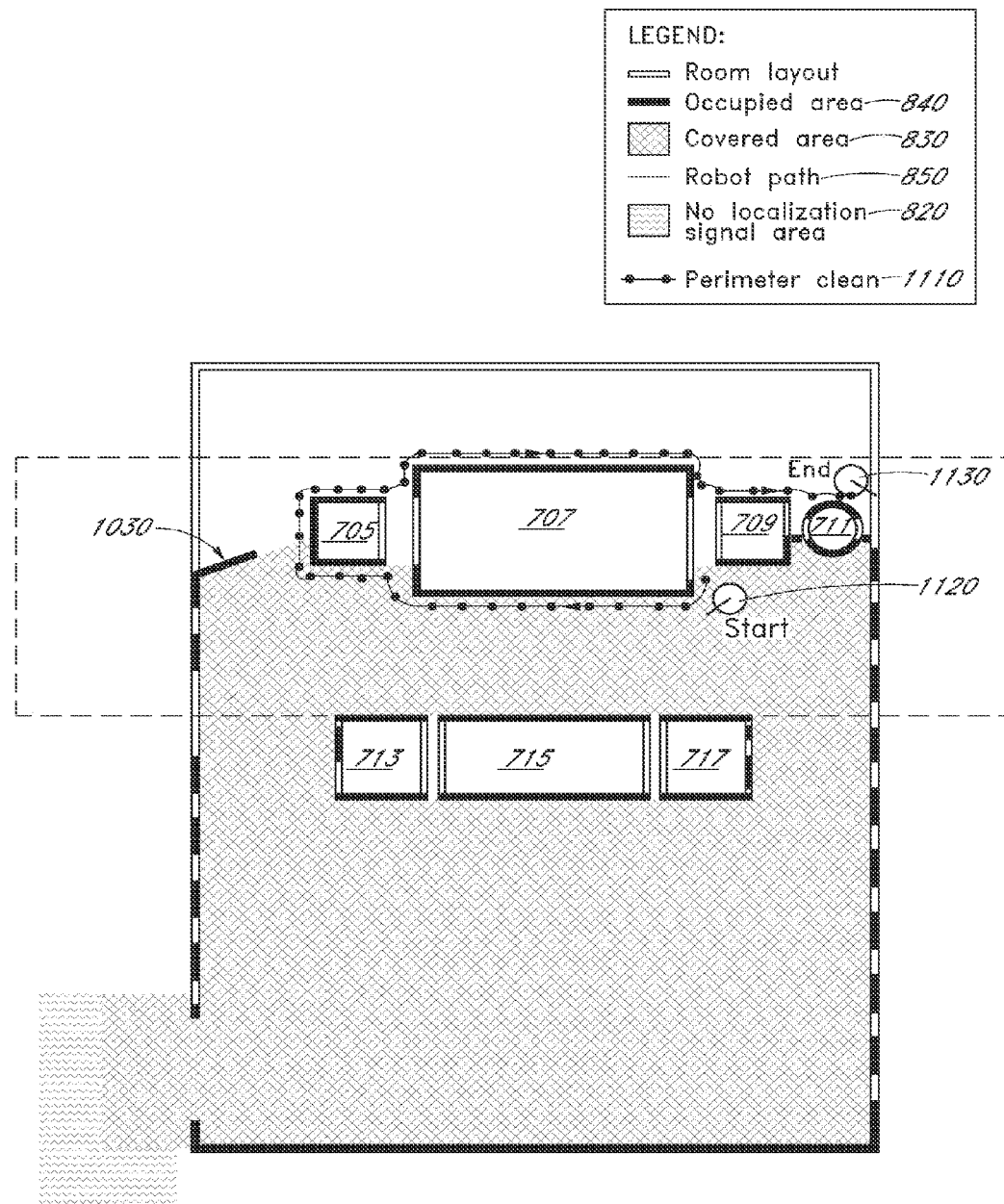

Referring to FIG. 11, the mobile device enters state 150 and invokes perimeter covering. The mobile devices moves to position 1120 based on a cost evaluation function and analysis of the map, and starts perimeter covering around the furniture. The perimeter covering routine causes the mobile device to move past the erroneous obstacle location because in some embodiments perimeter following/covering is purely reactive to the obstacles once it has begun. Map analysis selected a perimeter portion to cover, but the embodiment relied on physical sensors to continue following the obstacle and updated the map based on its observations. Moving past the erroneous obstacle location 1030 creates a new frontier that can be covered by snaking action. When the perimeter covering routine detects a new snake frontier that satisfies SCI the perimeter covering routine exits with end condition "snake created".

Figure 12:
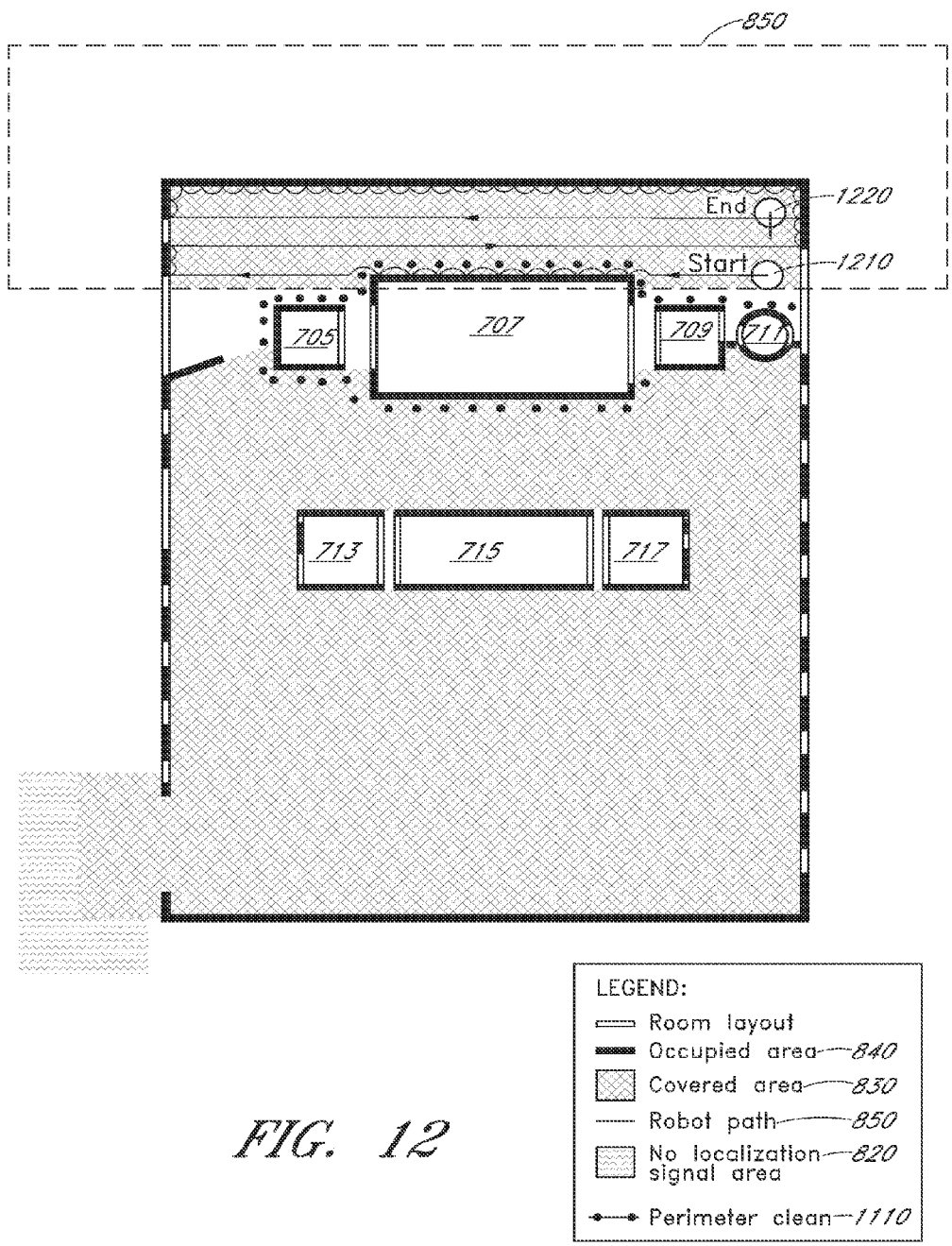

Referring to FIG. 12, the covering control routine 100 loops back into region covering with start condition "cover created snake". The mobile device snakes starting along the large frontier created by the perimeter covering action 1110 of FIG. 11.

Figure 13:
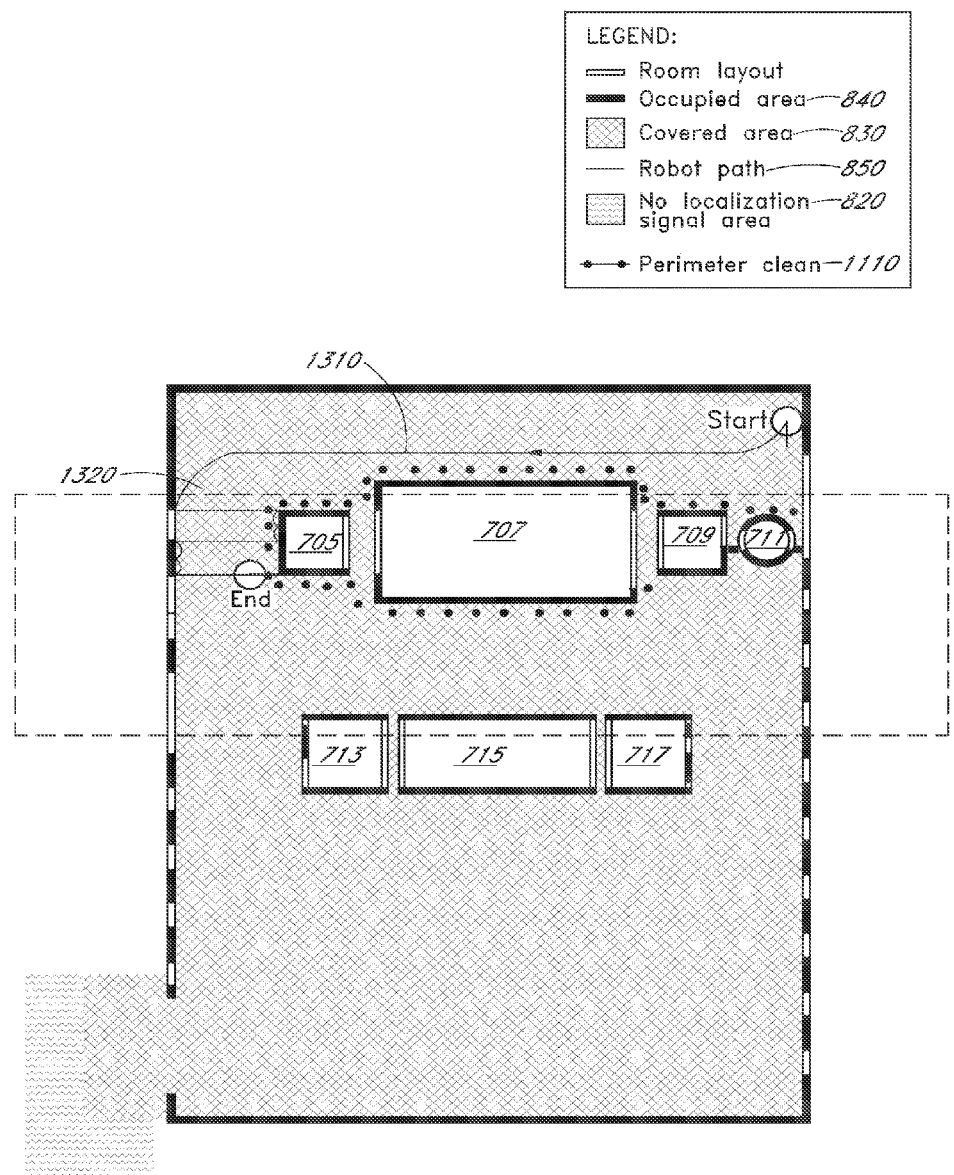

Referring to FIG. 13, a second frontier that qualifies for snake covering is located in the map. The mobile device moves to that frontier following path 1310 and performs a snaking action. Then there are no more frontiers that qualify for snake covering. Region covering exists and perimeter covering is re-entered.

Figure 14:
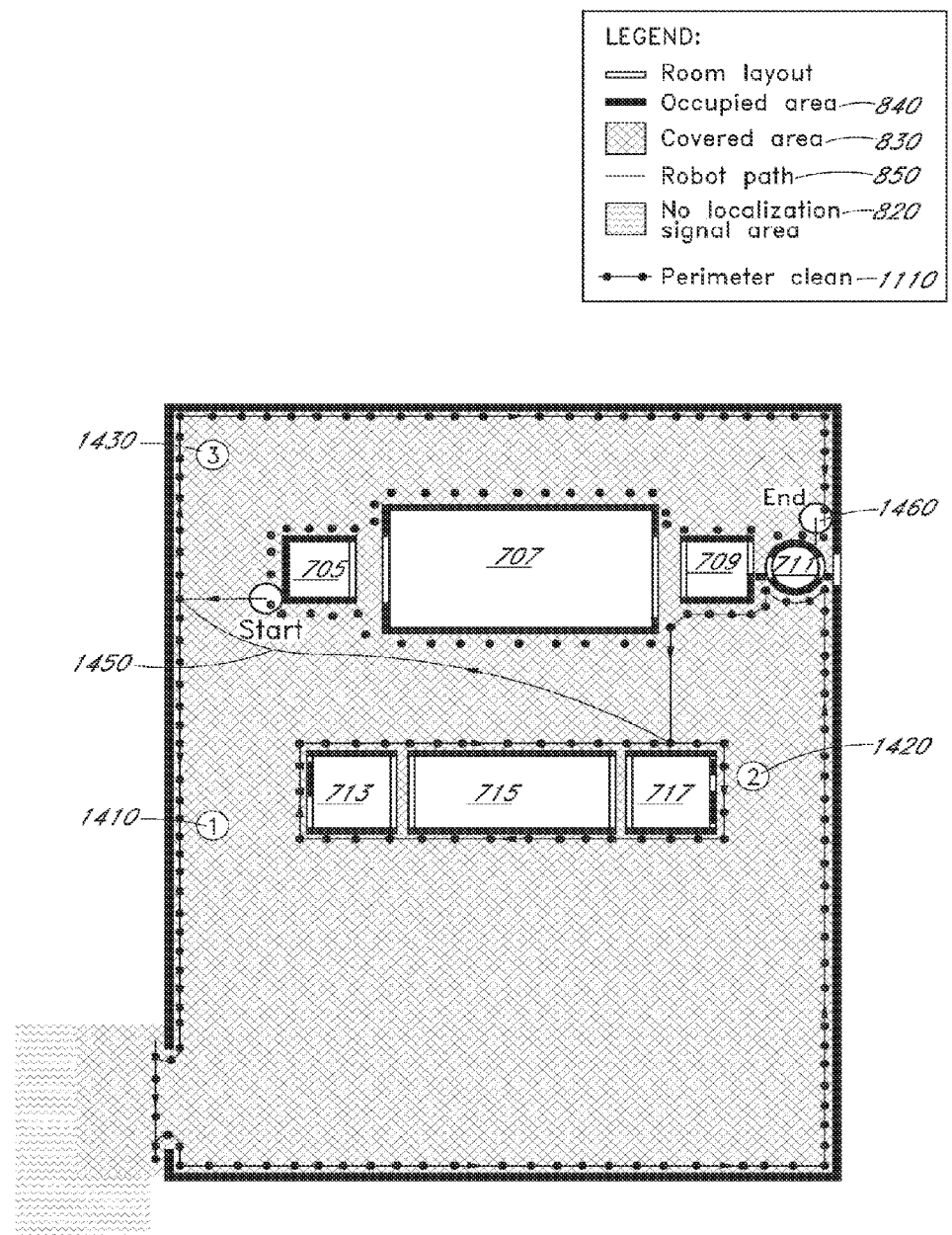

Referring to FIG. 14, the mobile device covers all the perimeter portions that had not been covered during the previous perimeter covering action. No new snakable frontiers are created by the perimeter covering action in this example. The control routine 100 exits at state 160.

Dynamic Resizing of Covering Region

As disclosed above, the definition of regions and their bounding boxes can vary amongst embodiments and even in a single embodiment. By way of further example of dynamic regions, regions may be defined and information about them stored in the map before the mobile device acquires any knowledge about the surface, including its layout. In some embodiments, these predefined regions may be defined in such a way that the mobile device does not extend its ranks from one (unknown) wall border to an opposing (unknown) wall border because the region does not encompass both borders. The result may be a snaking action and coverage route that is not as logical or predicable to, for example, a human observer. FIG. 15(B) illustrates one such situation. The region has a predefined fixed size and when the bounding box 1520 is located relative to the location 1530 of the mobile device, the region does not include or extend beyond lower wall 1510.

In an example of an embodiment with dynamically resized regions, an initial bounding box 1520 (for example, one 2 m×1.5 m) may be established. However, the length of the region is extended as the mobile device starts traversing the ranks 1540 until an obstacle is sensed in the path of the mobile device, at which point the region stops expanding and has a final dimension as illustrated in FIG. 15(B).

Deferred Coverage

Figure 16:
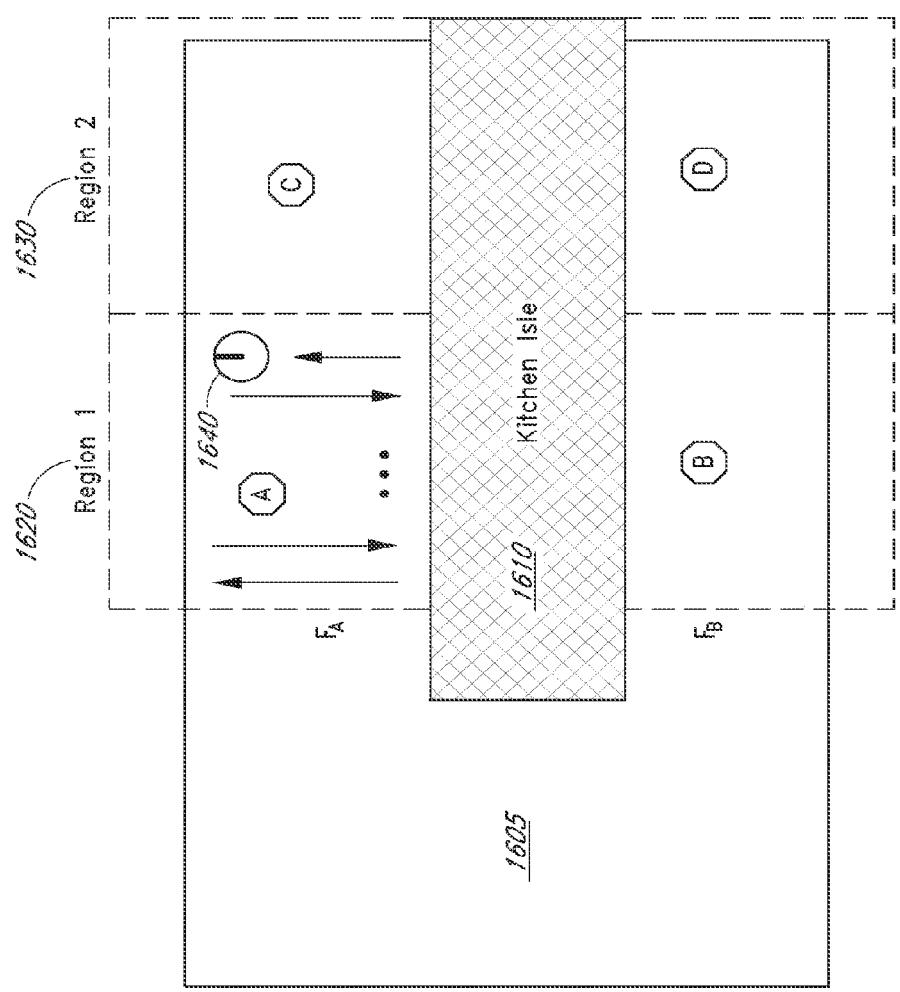
FIG. 16 illustrates an example of deferred navigation.

In some surface configurations, region based covering as illustrated in FIG. 2 and described above may cause a mobile device to travel large distances to reach the frontiers. An example is illustrated in FIG. 16. A kitchen isle 1610 splits the current regionl 1620 into two halves such that no path exists within the region to go from point A to point B. Assuming that during exploration/covering of 1605, the mobile device discovered frontiers $F_A$ and $F_B$. According to the illustrated processes 100, 200, 300, and 500, after covering the frontier $F_A$ of Region1, the mobile device would have to travel back over the covered portion of the surface to reach frontier $F_B$. In an embodiment with deferred coverage, the mobile device will instead add frontier $F_B$ to, for example, a list of deferred frontiers and proceed to C. The order of coverage may then be A, C, B, D. The alternative order, without deferred coverage, might be A, B, D, C (or even A, B, C, D). Both alternatives involve move travel over previously explored space than using deferred covering and result in behavior that is less surprising to observers. Embodiments with deferred coverage may have a snaking or traversal protocol that takes this into account.

In one embodiment, the overall covering efficiency and mobile device predictability is increased by deferring covering some of the portions of a region. For example, the mobile device may decide to defer covering of a frontier if the "cost" to cover that frontier is too high, given the current state of the mobile device. This cost can be the ratio of the distance to the frontier and the length of the largest snake rank performed in the current region or other metrics, including those that incorporate resource costs or time. Deferred frontiers may be stored in a list in a similar fashion to the map or as part of the map. They may be covered by the mobile device once it has completed region-based covering. The mobile device can again decide which deferred frontier is most optimal to cover first, given its current state and knowledge of the surface as embodied in the map. Various metrics such as those discussed above may be used. For example, in one embodiment, the distance to the frontier start is the metric used.

Restricted Coverage

A restricted covering mode allows some embodiments to prioritize coverage of certain portions of a surface over others. Other restricted covering modes prevent the mobile device from exploring certain portions of the surface. Such a mode may be used to, for example, prevent a mopping robot from covering (and mopping) a carpeted portion of floor. A mobile device configured with a localization system can be made to cover within (or avoid) a restricted portion of the surface without the need for any external intervention (such as by a user) through the use of removable or temporary signal emitters. For example, depending on the configuration of the mobile device and what type of signal sensors it has, strategically placing IR emitters or magnetic strips may create a virtual boundary which a mobile device will not pass.

In one such embodiment, illustrated in FIG. 17, a mobile device with initial pose 1740 is restricted to cover only the upper right quadrant 1710 with respect to initial pose 1740. The coverage procedures described above can be adapted to fit this constraint by treating the detection of a virtual wall 1730 an obstacle and thereby preventing a mobile device from passing through it. For example, by placing the mobile device on one side or the other of the virtual walls 1730, a user can control whether the mobile device operates within region 1710 or outside it.

Overlapping Coverage

In some instances it is advantageous to reduce or minimize overlap between regions so as to avoid repeated traversing of the same location and to thereby finish coverage sooner and/or with less expenditure of resources such as power and any consumables such as cleaning supplies used by the mobile device. Even in some such instances, a variety of factors may result in overlap among regions. Some such overlap may be intentional, or reasons similar to what has been discussed in the context of navigation and ranks. For example, an embodiment may define regions that overlap with one another for aesthetic or functional requirements (e.g., those related to mopping or sweeping functions) such as helping regions appear to "blend" into one another or ensuring that seams between regions are covered. Some embodiments may intentionally define overlapping regions to help account for discrepancies between the map and the actual surface. An embodiment which defines regions on a map that inaccurately reflects the surface (for example, due to accumulated sensor error or other factors discussed above) may intentionally define overlapping regions to help compensate for such error. Yet another embodiment may not define overlapping regions on a map, but will cause a mobile device to cover overlapping surface locations because, for example, of errors in the map. Still another embodiment may define overlapping regions to facilitate other aspects of covering. For example, a non-overlapping region may be too small to allow snaking, so a larger region, which overlaps adjacent regions, may be defined. These are merely illustrative examples of why, even in embodiments with a bias towards non-overlapping regions, there may still be 10, 25, 33, 50, or some other percent overlap between any two regions.

However, in certain situation (i.e., particular surface layouts, possibly in conjunction with particular starting positions) coverage routines such as those described above may still systematically neglect a portion of a surface such as by consistently failing to detect a theoretically reachable portion of the surface.

Figures 18A, 18B:
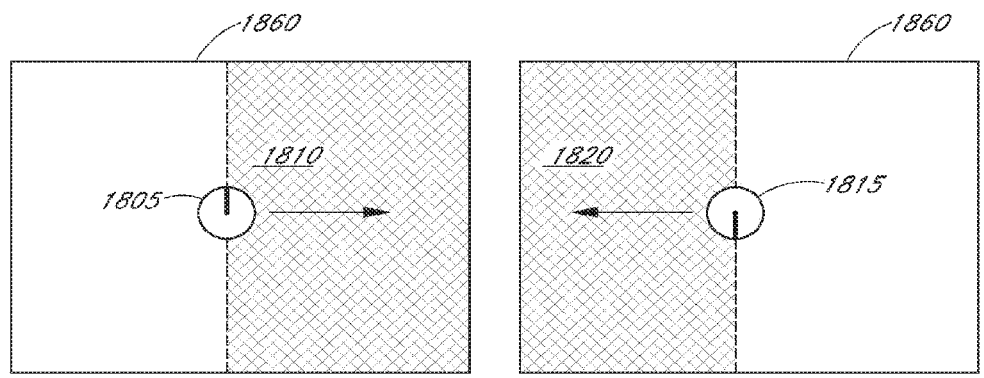
FIGS. 18A-18D illustrates an example of overlapping coverage.
Figures 18C, 18D:
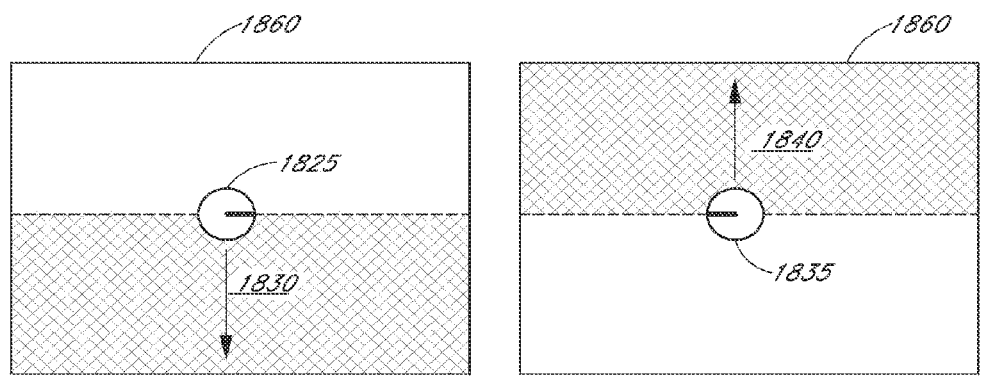

This potential risk can be mitigated by some embodiments which perform overlapping (and thus theoretically redundant) coverage routines. In one such embodiment, a mobile device is configured to perform "criss-cross" coverage by making two additional calls to region based cleaning process 200 before states 135 and 140. Whereas the previously described "cover right" and "cover left" invocations involve a rotation of 90 degrees clockwise and 90 degrees counterclockwise, invocation of region-based cleaning with "cover down" and "cover up" involve a rotation of 180 degrees a second rotation of 180 degrees. The processes can otherwise be analogous to those previously described. The result is a coverage strategy as illustrated in FIG. 18. In addition to covering right and left halves of the surface, as shown in FIG. 18A and FIG. 18B, such a mobile device covers top and bottom halves of the surface as shown in FIG. 18C and FIG. 18D. In general, the four invocations could be made in other orders. The invocations may be followed by open region covering and perimeter covering, as previously described.

Dividing a surface into four overlapping halves allows a mobile device to cover the same areas in two orthogonal directions. Such criss-cross coverage may have other advantages in particular embodiments. For example, it can reduce streaking patterns left on floors by cleaning robots from the drying out of cleaning fluid and allow lawn mowing robots or vacuuming robots to create more aesthetically pleasing patterns.

Physical Components

Figure 4:
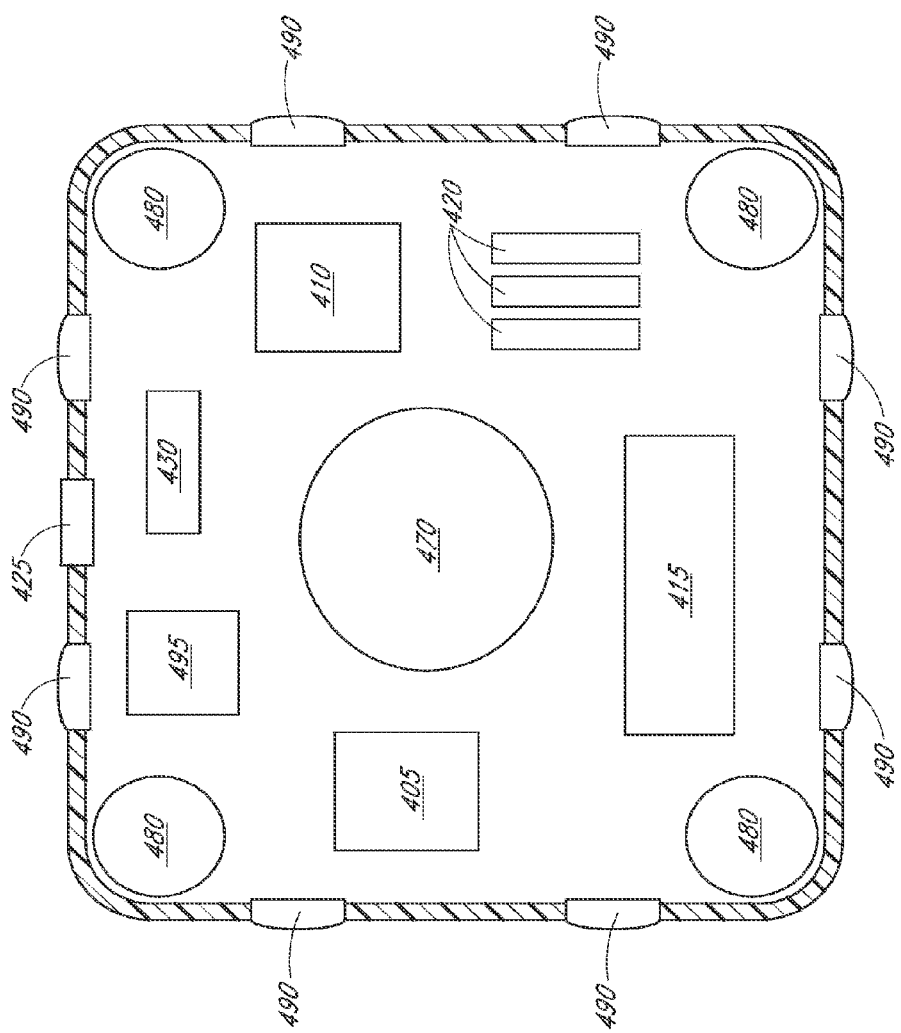
FIG. 4 illustrates some of the components that may compose an embodiment of a mobile device.

FIG. 4 illustrates example physical components of an appropriately configured mobile device. Such a device may include dead reckoning sensors 490 and/or signal sensors 470. These sensor components may communicate with one or more processors 410. The processor may be, for example, a specially configured chip or a more general processor configured through software. The processor may include its own storage and/or the device 400 may include additional memory or storage 420 (e.g., to store software and the data to implement some or all of the methods described herein). In some embodiments the sensors 470 and/or 490 may also store data directly in the memory 420. Software for implementing aspects of what is disclosed may be stored in ROM, flash memory, magnetic memory, optical memory, and/or some other form of persistent storage, although volatile storage (e.g., RAM) may be used as well. Data may be stored in volatile (e.g., can be erased when the system powers down) and/or non-volatile memory (which stores the data for later access even if the device is powered down and then powered up again). The processor 410 and storage 420 may also be used for functional purposes not directly related to localization. For example, the mobile device 100 may use the processor 410 and storage 420 when performing tasks such as cleaning or guarding or when interpreting data from the sensors 470 and 490. In other embodiments, the processing 410 and storage 420 are dedicated to covering and the device contains additional computational capacity for other tasks.

The sensors 490 may include a wide range of dead reckoning sensors, motion sensors, radar and sonar type devices, and other forms of obstacle detection. There may also be dedicated obstacle detectors, and the corners may be outfitted with corner detectors or the like. For example, an accelerometer 495 may be present.

The processor 410 and or storage 420 may be operatively connected to various output mechanisms such as screens or displays, light and sound systems, and data output devices (e.g., busses, ports, and wireless or wired network connections). Mobile device 400 is shown with a port, such as a USB port, at 425. The processor 410 and/or the storage 420 is also operatively connected to a locomotion system which may include wheels 480, or other forms of locomotion such as tracks or fins and rudders and a propulsion source. Movement may involve in signals being sent to various controllers such as motors (including drive motors or servomotors), brakes, actuators, etc., which may cause the mobile device to move to a new pose (or to perform another activity, such as a cleaning function). The move to this new pose may, in turn, trigger additional output from the sensors to the processor. An example embodiment is configured with an ARM7 processor, 256K of flash ROM for software, and 64K of RAM for data. These are not minimum or maximum requirements—some or all of what is disclosed herein can be accomplished with less or more processing and storage capacity. Other embodiments may be different processors and different memory configurations, with larger or smaller amounts of memory.

Mobile device 400 is also shown with a power supply 430, a control panel 405 for user input. More or fewer components, including but not limited to functional components such as for cleaning or performing other tasks, may also be present.

Broadly Applicable

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof.

While certain embodiments may be illustrated or discussed as having certain example components, additional, fewer, or different components may be used. Further, with respect to the processes discussed herein, various states may be performed in a different order or substantially in parallel, not all states are required to be reached, and fewer, additional, or different states may be utilized.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein.

What is claimed is:

1. A mobile device configured to navigate a surface, the mobile device comprising:
   a movement mechanism configured to move the mobile device among poses on the surface, each of the poses comprising a respective location and orientation of the mobile device on the surface;
   a mapping module configured to update a map representing data about the surface, the map associating locations of the surface with one or more properties, the properties being indicative of unexplored, explored, and occupied locations, wherein frontiers indicate respective boundaries between the explored locations and the unexplored locations, and edges indicate respective boundaries between the explored locations and the occupied locations;
   a region-covering module configured to cause the movement mechanism to move the mobile device so as to cover regions of the surface and to cause the mapping module to update the map responsive thereto;
   an edge-following module configured to cause the movement mechanism to move the mobile device along edges, cause the mapping module to extend the edges and add frontiers that are adjacent one or more of the edges and are discovered as the mobile device moves along the edges, and cause the region-covering module to cause the movement mechanism to move the mobile device so as to cover one or more of the frontiers responsive to discovery thereof during moving the mobile device along the edges.

2. The mobile device of claim 1, wherein each of the modules comprises a computerized system, and wherein, when no further frontiers are discovered, the edge following module is configured to cause the movement mechanism to move the mobile device along at least some of the edges that have been previously discovered.

3. The mobile device of claim 1, further comprising an additional region-covering module comprising a computerized system and configured to identify map locations comprising the frontiers and, responsive to identification of one or more of the frontiers, to cause the movement mechanism to stop moving the mobile device along the edges and move the mobile device so as to cover one of the regions of the surface defined at least in part based on the at least one of the frontiers and to cause the mapping module to update the map.

4. The mobile device of claim 1, wherein the movement mechanism comprises one or more wheels.

5. The mobile device of claim 1, wherein the movement mechanism comprises one or more tracks.

6. The mobile device of claim 1, wherein the movement mechanism comprises at least a rudder component and at least a propulsion component.

7. The mobile device of claim 1, wherein the mapping module is configured to associate at least one of the locations with one or more properties based at least in part on information from one or more sensors associated with the mobile device.

8. The mobile device of claim 7, wherein the mapping module is configured to associate the at least one of the locations as an explored location responsive to indication by the sensors that the mobile device is in or has moved through that location.

9. The mobile device of claim 7, wherein the mapping module is configured to associate the at least one of the locations as an occupied location responsive to indication by the sensors that mobile device cannot move into that location.

10. The mobile device of claim 1, wherein the mapping module is configured to associate one of the locations as an unexplored location if the one of the locations is adjacent to an explored location and is not indicated as an occupied location or an explored location.

11. The mobile device of claim 1, wherein a region is covered if at least 90% of what is accessible to the mobile device is associated with an explored location on the map.

12. The mobile device of claim 1, wherein a region is covered if at least 80% of what is accessible to the mobile device is associated with an explored location on the map.

13. The mobile device of claim 1, wherein at least one of the regions has a definition which is independent of properties of the surface.

14. The mobile device of claim 1, wherein each of the regions is a proper subset of the surface.

15. The mobile device of claim 1, wherein at least one of the regions has static dimensions.

16. The mobile device of claim 1, wherein at least one of the regions has at least one dynamic dimension.

17. The mobile device of claim 16, wherein a first region of the regions has at least one dynamic dimension determined at least in part by at least one dimension of a second region of the regions.

18. The mobile device of claim 1, wherein a first region of the regions and a second region of the regions are non-overlapping if less than 10% of the first region is in the second region.

19. A method of operating a mobile robot to navigate a surface, the method comprising:
   storing, in a computer readable memory, a map associating locations of the surface with one or more properties, the properties being indicative of unexplored, explored, and occupied locations, wherein frontiers indicate respective boundaries between the explored locations and the unexplored locations, and edges indicate respective boundaries between the explored locations and the occupied locations;
   operating a movement mechanism to move the mobile robot among poses on the surface, each of the poses comprising a respective location and orientation of the mobile robot on the surface, so as to cover regions of the surface;
   updating the map responsive to operating the movement of the mobile robot to cover the regions of the surface; and
   operating the movement mechanism to move the mobile robot along edges;
   updating the map to extend the edges and add frontiers that are adjacent one or more of the edges and are discovered as the mobile robot moves along the edges; and
   operating the movement mechanism to move the mobile robot so as to cover one or more of the frontiers responsive to discovery thereof during movement of the mobile robot along the edges.

20. The method of claim 19, wherein the frontiers discovered as the mobile robot moves along the edges were missed responsive to erroneous detection of an obstacle during the operating of the movement mechanism to move the mobile robot so as to cover the regions of the surface.

21. The method of claim 19, wherein the frontiers discovered as the mobile robot moves along the edges occur between first and second ranks, at an opposite end from an end where the mobile robot moves from the first rank to the second rank, in the operating of the movement mechanism to move the mobile robot so as to cover the regions of the surface.

* * * * *

UNITED STATES PATENT AND TRADEMARK OFFICE
CERTIFICATE OF CORRECTION

PATENT NO. : 9,895,808 B2  
APPLICATION NO. : 14/880610  
DATED : February 20, 2018  
INVENTOR(S) : Stout et al.

Page 1 of 1

It is certified that error appears in the above-identified patent and that said Letters Patent is hereby corrected as shown below:

In the Specification

Column 19, Line 4: Please correct "Fri" to read -- Fr1 --

Signed and Sealed this  
Twenty-second Day of May, 2018

Andrei Iancu  
*Director of the United States Patent and Trademark Office*